US006570965B1

United States Patent
Isely et al.

(10) Patent No.: US 6,570,965 B1
(45) Date of Patent: May 27, 2003

(54) CONFIGURABLE TELEPHONE LINE DISTRIBUTION MODULES FOR DESIGNATING PRIMARY AND SECONDARY TELEPHONE LINES

(75) Inventors: Larson J. Isely, Durham, NC (US); Gary Deen, Durham, NC (US); William J. Grasty, Chapel Hill, NC (US); Jeffrey A. Hatley, Mebane, NC (US); Todd J. Honnigford, Cary, NC (US); Larry M. Hicks, Oxford, NC (US); Jeffrey McLamb, Raleigh, NC (US); Stephen Lye, Raleigh, NC (US)

(73) Assignee: Home Director, Inc., Morrisville, NC (US)

( * ) Notice: Subject to any disclaimer, the term of this patent is extended or adjusted under 35 U.S.C. 154(b) by 354 days.

(21) Appl. No.: 09/705,248

(22) Filed: Nov. 2, 2000

(51) Int. Cl.[7] .............................................. H04M 11/00
(52) U.S. Cl. .............................. 379/93.07; 379/399.01; 379/413.02
(58) Field of Search ........................ 379/93.07, 93.05, 379/90.01, 93.09, 93.11, 399.01, 413.02, 413.03, 413.04

(56) References Cited

U.S. PATENT DOCUMENTS

| 5,625,686 A | * | 4/1997 | Capper et al. ............... 379/399 |
| 5,682,301 A | | 10/1997 | Kraft |
| 5,774,979 A | | 7/1998 | Kraft |
| 5,787,155 A | * | 7/1998 | Luna ........................ 379/93.09 |
| 5,903,643 A | * | 5/1999 | Bruhnke ...................... 379/399 |
| 6,026,160 A | * | 2/2000 | Staber et al. ................ 379/399 |
| 6,029,047 A | * | 2/2000 | Ishida et al. .............. 379/93.07 |
| 6,074,247 A | | 6/2000 | Hall et al. |
| 6,304,644 B2 | * | 10/2001 | Karnowski ............... 379/93.07 |

FOREIGN PATENT DOCUMENTS

WO    WO 00/03518    1/2000

* cited by examiner

Primary Examiner—Stella Woo

(57) ABSTRACT

Telephone line distribution apparatus are provided that permit easy user-selection of primary and secondary telephone lines without requiring physical rewiring of RJ plugs or receptacles. A telephone line distribution apparatus includes a first RJ connector, one or more second RJ connectors, and a switching device that allows a subscriber to designate which of a plurality of incoming telephone lines is the subscriber's primary line and secondary line. A switching device has various user-selectable configurations. When in a first configuration, a first incoming telephone line becomes the subscriber primary telephone line at one or more of the second RJ connectors. When the switching device is in a second configuration, a second incoming telephone line becomes the subscriber primary telephone line at one or more of the second RJ connectors. Additional incoming telephone lines can be designated as primary or secondary telephone lines in a similar manner. Telephone line distribution apparatus may also include DSL signal splitting capabilities.

56 Claims, 18 Drawing Sheets

CONFIGURABLE TELEPHONE LINE DISTRIBUTION MODULES FOR DESIGNATING PRIMARY AND SECONDARY TELEPHONE LINES

FIELD OF THE INVENTION

The present invention relates generally to communications, and more particularly to telephone communications.

BACKGROUND OF THE INVENTION

A demarcation point, referred to as a network interface device (NID), is typically provided between a telephone subscriber's premises line and an incoming line from a telephone service provider. A device typically used at a NID for physically connecting subscriber telephone line(s) with incoming telephone provider line(s) is referred to as a subscriber bridge. A subscriber bridge typically includes a jack connected to an incoming telephone line. A plug connected to the subscriber's telephone line is generally located nearby. When the plug of the subscriber's line is inserted into the jack, an interconnection is made between the subscriber's telephone line and the incoming telephone service provider line.

Increasingly, existing homes and homes under construction are being "networked" wherein communications cables (video, data, and telephone) are being extended to multiple rooms. The benefits of "home networking" may include the ability to network multiple computers, printers and peripherals throughout a home; to access the Internet through a single high-speed connection in multiple locations in the home; to watch an internally modulated video signal such as a video cassette recorder (VCR), digital video disk (DVD), or satellite television receiver from any room in the home; to use a digital phone system, such as an ISDN line, throughout the home; to add security video cameras in the home and view them on any television; and to add future equipment that may allow a homeowner to use the same hand-held remote control in any room.

Home networking conventionally utilizes a central distribution panel that serves as a gateway or interface to various communications services. Within a conventional central distribution panel, cable distribution modules are typically utilized to receive a cable from a service provider and to distribute the service provided through the cable among various distribution cables that are routed throughout the home. For example, a telephone line distribution module may be configured to distribute an incoming telephone service provider line into multiple cables routed within a home.

A conventional central distribution panel 10 for receiving and distributing various telecommunications services is illustrated in FIG. 1. A telecommunications service entering a home is typically routed into the central distribution panel 10 via a cable. From the central distribution panel 10, telecommunications cables are routed to wall taps in various locations throughout a home to distribute the various telecommunications services.

A series of telephone connection interfaces (receptacles and plugs) referred to as "RJ" (registered jacks) are conventionally utilized to interconnect an incoming telephone service provider line with multiple cables routed within a home. An RJ-14 jack conventionally has four contacts which usually make electrical connections to a red and green pair of wires, and a black and yellow pair of wires. One wire in each pair is conventionally referred to as a "tip" wire, and the other wire in each pair is conventionally referred to as a "ring" wire.

A conventional RJ-14 plug 20 is illustrated in FIG. 2A, and a conventional RJ-14 receptacle 22 configured to receive an RJ-14 plug is illustrated in FIG. 2B. As is known to those skilled in the art, wires (not shown) terminate at the illustrated RJ-14 plug 20 at respective pins 1–4. Similarly, and as known to those skilled in the art, wires (not shown) terminate at the illustrated RJ-14 receptacle 22 at respective pins 1–4. As is understood by those skilled in the art, pins 1–4 in an RJ-14 plug 20 are configured to electrically connect with pins 1–4 in an RJ-14 receptacle 22 receiving the RJ-14 plug therein.

By convention, wires terminating at pins 2 and 3 in an RJ-14 plug 20 and receptacle 22 represent the primary telephone line, wherein one pin (2 or 3) is the tip wire and the other pin (2 or 3) is the ring wire of the primary telephone line. By the same convention, wires terminating at pins 1 and 4 in an RJ-14 plug 20 and receptacle 22 represent the secondary telephone line, wherein one pin (1 or 4) is the tip wire and the other pin (1 or 4) is the ring wire of the secondary telephone line.

A conventional RJ-45 plug 24 is illustrated in FIG. 3A, and a conventional RJ-45 receptacle 26 configured to receive an RJ-45 plug is illustrated in FIG. 3B. As is known to those skilled in the art, wires terminate at the illustrated RJ-45 plug 24 at respective pins 1–8. Similarly, and as is known to those skilled in the art, wires terminate at the illustrated RJ-45 receptacle 26 at respective pins 1–8. As is understood by those of skill in the art, pins 1–8 in an RJ-45 plug 24 are configured to electrically connect with pins 1–8 in an RJ-45 receptacle 26 receiving an RJ-45 plug therein.

By convention, wires terminating at pins 4 and 5 in an RJ-45 plug 24 and receptacle 26 represent the primary telephone line, wherein one pin (4 or 5) is the tip wire and the other pin (4 or 5) is the ring wire of the primary telephone line. By the same convention, wires terminating at pins 3 and 6 in an RJ-45 plug 24 and receptacle 26 represent the secondary telephone line, wherein one pin (3 or 6) is the tip wire and the other pin (3 or 6) is the ring wire of the primary telephone line. Wires terminating at pins 1 and 2 in an RJ-45 plug 24 and receptacle 26 represent the third telephone line, wherein one pin (1 or 2) is the tip wire and the other pin (1 or 2) is the ring wire of the third telephone line. Wires terminating at pins 7 and 8 in an RJ-45 plug 24 and receptacle 26 represent the fourth telephone line, wherein one pin (7 or 8) is the tip wire and the other pin (7 or 8) is the ring wire of the fourth telephone line.

It may be desirable for a subscriber to be able to designate which line, from two or more incoming lines, is the primary telephone line. Exemplary situations where this may be desirable include where an office is maintained in the home, where high speed internet service is provided via one the incoming lines, and where telephones utilized are designed to accept only one or two incoming lines. Unfortunately, for a subscriber having multiple telephone lines, the above-described convention may make it difficult to designate different lines as the primary and secondary lines. For example, a subscriber wishing to switch the primary and/or secondary line designations within an RJ-14 (or RJ-45) jack may be required to physically alter the positions of the respective tip and ring wires (either at the plug or receptacle) to conform to the above-described convention. For example, the subscriber using the RJ-14 plug of FIG. 2A may be required to physically switch the respective wires terminating at pins 1 and 2, and would also have to physically switch the respective wires terminating at pins 3 and 4. Because the physical reconfiguration of RJ plugs and/or receptacles is generally undesirable, a need exists for a convenient and easy way of redesignating primary and secondary telephone lines.

SUMMARY OF THE INVENTION

In view of the above discussion, telephone line distribution apparatus that permit easy user-selection of primary and secondary telephone lines without requiring physical rewiring of RJ plugs or receptacles are provided. According to an embodiment of the present invention, a telephone line distribution apparatus includes a first RJ connector, one or more second RJ connectors, and a switching device that allows a subscriber to designate which of a plurality of incoming telephone lines is the subscriber's primary line and secondary line. The first RJ connector includes first tip and ring pins that are electrically connected to respective tip and ring wires of a first incoming telephone line, and second tip and ring pins that are electrically connected to respective tip and ring wires of a second incoming telephone line. Additional tip and ring pins may be connected to respective tip and ring wires of additional incoming telephone lines.

One or more of the second RJ connectors includes first tip and ring pins that are electrically connected to respective tip and ring wires of a subscriber primary telephone line, and second tip and ring pins that are electrically connected to respective tip and ring wires of a subscriber secondary telephone line. The switching device has first and second user-selectable configurations. When in the first configuration, the first incoming telephone line becomes the subscriber primary telephone line at one or more of the second RJ connectors. When the switching device is in the second configuration, the second incoming telephone line becomes the subscriber primary telephone line at one or more of the second RJ connectors.

According to embodiments of the present invention, the switching device includes a terminal block having first, second, third, and fourth ring terminals arranged in a row in adjacent, spaced-apart relationship. The terminal block also includes first, second, third, and fourth tip terminals arranged in adjacent, spaced-apart relationship. The second and fourth ring terminals are electrically connected to the first ring pin at each of the second RJ connectors. The second and fourth tip terminals are electrically connected to the first tip pin at each of the second RJ connectors.

The switching device also includes a shunt device that is configured to be removably secured to the terminal block in first and second positions. In the first position, the shunt device electrically connects the first and second ring terminals of the terminal block and electrically connects the first and second tip terminals of the terminal block so that the first incoming telephone line becomes the subscriber primary telephone line at one or more of the second RJ connectors. In the second position, the shunt device electrically connects the third and fourth ring terminals of the terminal block and electrically connects the third and fourth tip terminals of the terminal block so that the second incoming telephone line becomes the subscriber primary telephone line at one or more of the second RJ connectors.

According to other embodiments of the present invention, telephone line distribution apparatus may be mounted on printed circuit boards (PCBs) and housed within cable distribution devices. Moreover, multiple PCBs may be electrically connected together to allow additional subscriber telephone lines to be designated as primary or secondary lines.

A telephone line distribution apparatus according to another embodiment of the present invention includes a first RJ connector, one or more second RJ connectors, and first and second switching devices that allow a subscriber to designate which of a plurality of incoming telephone lines is the subscriber's primary line and which is the secondary line. The first RJ connector includes first tip and ring pins that are electrically connected to respective tip and ring wires of a first incoming telephone line; second tip and ring pins that are electrically connected to respective tip and ring wires of a second incoming telephone line; third tip and ring pins that are electrically connected to respective tip and ring wires of a third incoming telephone line; and fourth tip and ring pins that are electrically connected to respective tip and ring wires of a fourth incoming telephone line.

One or more of the second RJ connectors includes first tip and ring pins that are electrically connected to respective tip and ring wires of a subscriber primary telephone line; second tip and ring pins that are electrically connected to respective tip and ring wires of a subscriber secondary telephone line; third tip and ring pins that are electrically connected to respective tip and ring wires of a subscriber tertiary telephone line; and fourth tip and ring pins that are electrically connected to respective tip and ring wires of a subscriber fourth telephone line.

The first switching device has first, second, third, and fourth user-selectable configurations. When the first switching device is in the first configuration, the first incoming telephone line becomes the subscriber primary telephone line at one or more of the second RJ connectors. When the first switching device is in the second configuration, the second incoming telephone line becomes the subscriber primary telephone line at one or more of the second RJ connectors. When the first switching device is in the third configuration, the third incoming telephone line becomes the subscriber primary telephone line at one or more of the second RJ connectors. When the first switching device is in the fourth configuration, the fourth incoming telephone line becomes the subscriber primary telephone line at one or more of the second RJ connectors.

The second switching device has first, second, third, and fourth user-selectable configurations. When the second switching device is in the first configuration, the first incoming telephone line becomes the subscriber secondary telephone line at one or more of the second RJ connectors. When the second switching device is in the second configuration, the second incoming telephone line becomes the subscriber secondary telephone line at one or more of the second RJ connectors. When the second switching device is in the third configuration, the third incoming telephone line becomes the subscriber secondary telephone line at one or more of the second RJ connectors. When the second switching device is in the fourth configuration, the fourth incoming telephone line becomes the subscriber secondary telephone line at one or more of the second RJ connectors.

According to other embodiments of the present invention, a telephone line distribution apparatus that allows a subscriber to designate which of a plurality of incoming telephone lines is the subscriber's primary line may include DSL signal splitting capabilities. According to an embodiment of the present invention, such a telephone line distribution apparatus may include a first RJ connector, a first switching device that identifies which one of the incoming telephone lines is carrying DSL signals, a splitter configured to separate DSL signals and voice telephone signals from an identified one of the incoming telephone lines, a second RJ connector electrically connected to the splitter that receives DSL signals that have been separated by the splitter, and a third RJ connector electrically connected to the splitter and to the first RJ connector to receive the incoming telephone lines that carry voice telephone signals only.

The present invention may provide a compact and easy way of customizing telephone lines within a home or building. Multiple telephone line combinations can be provided and modified without requiring the use of special wired cables or other devices which may be complicated and/or expensive.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "connected", "mounted", "secured", or "coupled" to another element, it can be directly connected, mounted or coupled to the other element or intervening elements may be present.

Figure 1:
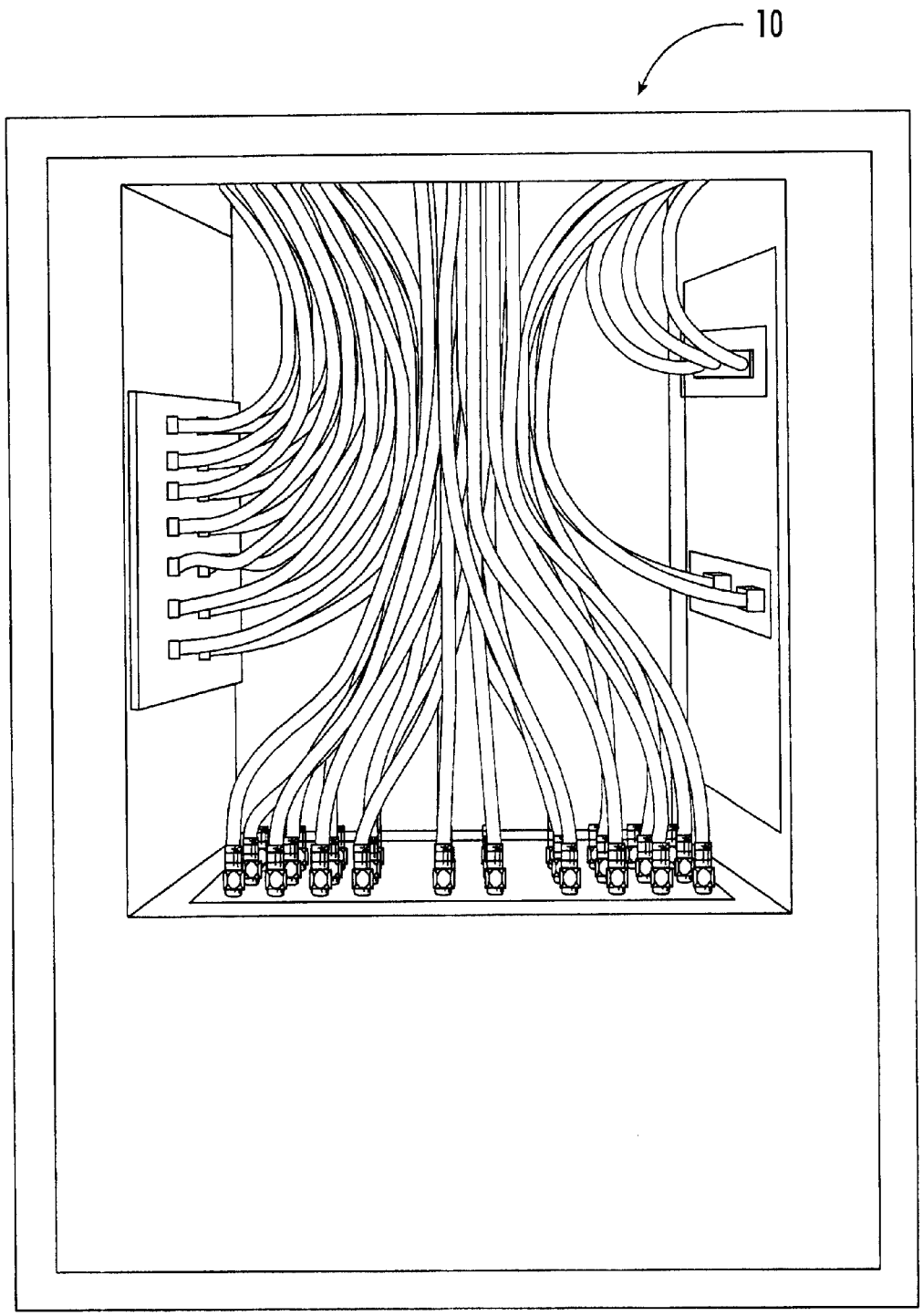
FIG. 1 is front elevational view of a conventional cable distribution panel illustrating various non-interchangeable cable distribution modules fixedly secured therewithin.
Figure 2A:
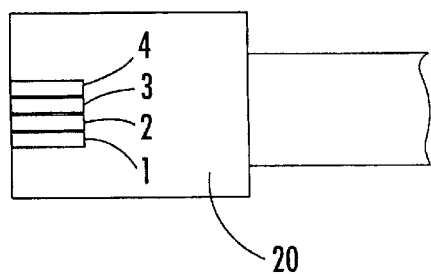
FIG. 2A is a schematic illustration of a conventional RJ-14 plug.
Figure 2B:
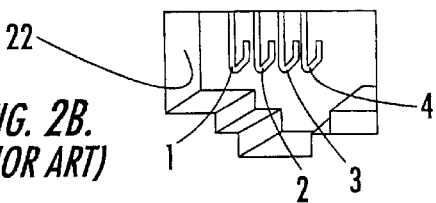
FIG. 2B is a schematic illustration of a conventional RJ-14 receptacle configured to receive the RJ-14 plug of FIG. 2A.
Figure 3A:
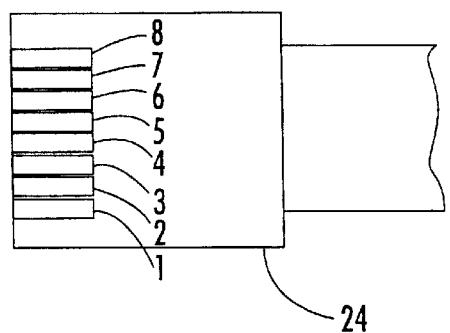
FIG. 3A is a schematic illustration of a conventional RJ-45 plug.
Figure 3B:
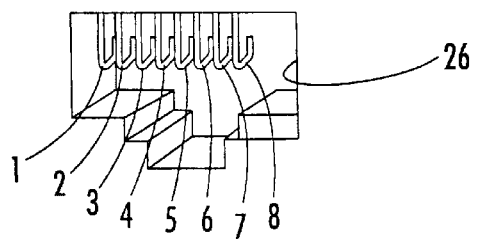
FIG. 3B is a schematic illustration of a conventional RJ-45 receptacle configured to receive the RJ-45 plug of FIG. 3A.
Figure 4:
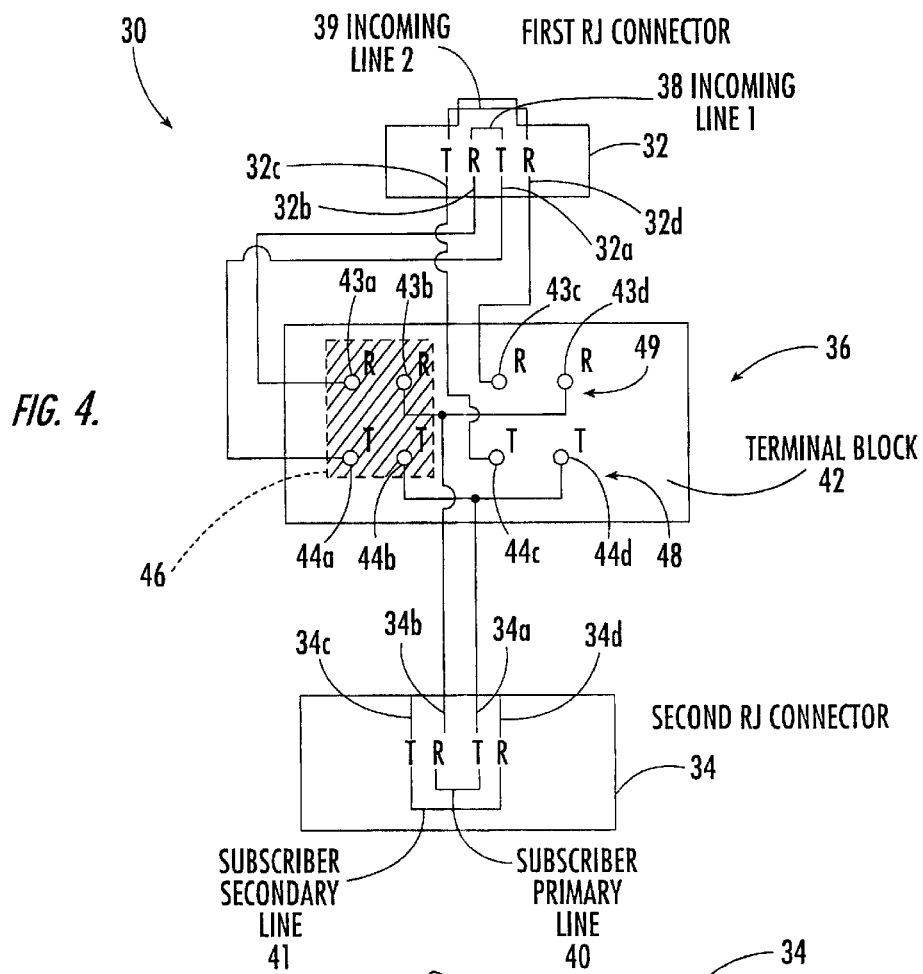
FIG. 4 is a schematic illustration of a telephone line distribution apparatus according to an embodiment of the present invention.

Referring now to FIG. 4, a telephone line distribution apparatus 30, according to an embodiment of the present invention, is illustrated. The telephone line distribution apparatus 30 includes a first RJ connector 32, a second RJ connector 34, and a switching device 36 that allows a subscriber to designate which of a plurality of incoming telephone lines is the subscriber's primary line. It is understood that embodiments of the present invention may include multiple first and/or second RJ connectors 32, 34.

The first RJ connector 32 includes first tip and ring pins 32a, 32b that are electrically connected to respective tip and ring wires (not shown) of a first incoming telephone line 38, and second tip and ring pins 32c, 32d that are electrically connected to respective tip and ring wires (not shown) of a second incoming telephone line 39 (typically from a NID). The second RJ connector 34 includes first tip and ring pins 34a, 34b that are electrically connected to respective tip and ring wires (not shown) of a subscriber primary telephone line 40, and second tip and ring pins 34c, 34d that are electrically connected to respective tip and ring wires (not shown) of a subscriber secondary telephone line 41.

The illustrated switching device 36 has first and second user-selectable configurations. When the switching device 36 is in the first configuration, the first incoming telephone line 38 becomes the subscriber primary telephone line 40 at the second RJ connector 34. When the switching device 36 is in the second configuration, the second incoming telephone line 39 becomes the subscriber primary telephone line 40 at the second RJ connector 34.

The switching device 36 includes a terminal block 42 having first, second, third, and fourth ring terminals 43a, 43b, 43c, 43d arranged in a row in adjacent, spaced-apart relationship, as illustrated. The terminal block 42 also includes first, second, third, and fourth tip terminals 44a, 44b, 44c, 44d arranged in adjacent, spaced-apart relationship, as illustrated. The second and fourth ring terminals 43b, 43d are electrically connected to the first ring pin 34b at the second RJ connector 34. The second and fourth tip terminals 44b, 44d are electrically connected to the first tip pin 34a at the second RJ connector 34.

The switching device 36 also includes a shunt device 46 that is configured to be removably secured to the terminal block 42 in first and second positions. In the first position, the shunt device 46 electrically connects the first and second ring terminals 43a, 43b of the terminal block 42 and electrically connects the first and second tip terminals 44a, 44b of the terminal block 42 so that the first incoming telephone line 38 becomes the subscriber primary telephone line 40 at the second RJ connector 34. (The shunt device 46 is illustrated in the first position in FIG. 4.) In the second position, the shunt device 46 electrically connects the third and fourth ring terminals 43c, 43d of the terminal block 42 and electrically connects the third and fourth tip terminals 44c, 44d of the terminal block 42 so that the second incoming telephone line 39 becomes the subscriber primary telephone line 40 at the second RJ connector 34.

It is understood that embodiments of the present invention may include other types of switching devices that serve the functions of the switching device 36. For example, other switching devices may be used to selectively connect the various terminals as described herein including, but not limited to, single pole single throw switches, single pole double throw switches, and other mechanically and/or electrically activated switches.

Figure 5:
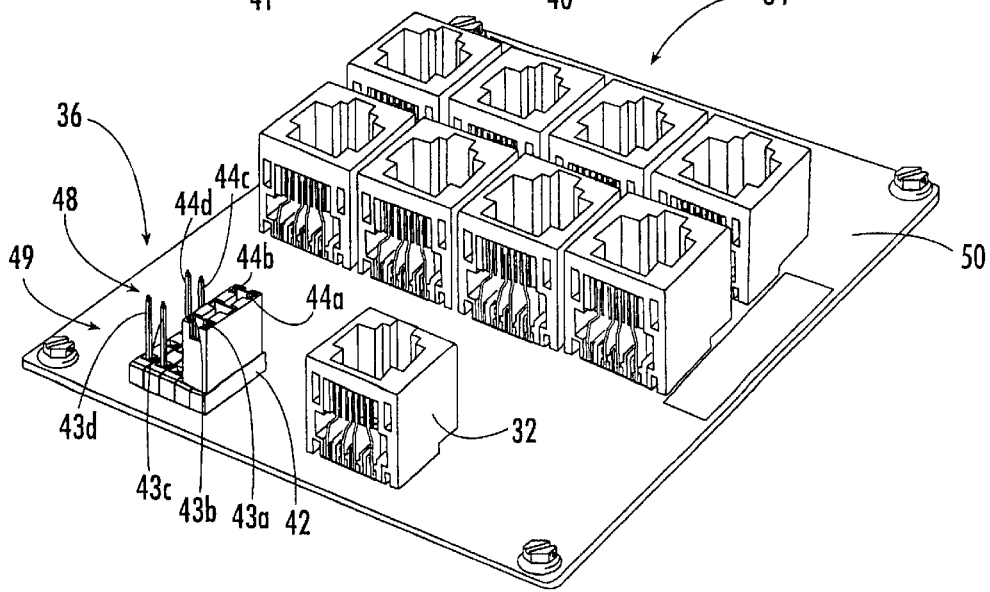
FIG. 5 is a perspective view of a telephone line distribution apparatus according to an embodiment of the present invention.

Referring now to FIG. 5, the telephone line distribution apparatus 30 of FIG. 4 is illustrated in a preferred embodiment. A first RJ connector 32 is mounted to a printed circuit board (PCB) 50 and is an RJ receptacle that is configured to receive an RJ plug of one to four incoming telephone lines. A plurality of second RJ connectors 34 are mounted on the PCB 50. Each of the second RJ connectors 34 are RJ receptacles configured to receive an RJ plug of a respective subscriber line.

The switching device 36 is also mounted to the PCB 50. The first, second, third, and fourth ring terminals 43a–43d of the switching device 36 are preferably respective posts (or other types of contacts) that extend from the terminal block 42 in a second row 49, as illustrated. The first, second, third, and fourth tip terminals 44a–44d of the switching device 36 are preferably respective posts that extend from the terminal block 42 in a first row 48 that is in adjacent, spaced-apart relationship with the second row 49.

In the illustrated embodiment, the shunt device 46 electrically connects the first and second ring terminals 43a, 43b, and electrically connects the first and second tip terminals 44a, 44b. Accordingly, the first incoming telephone line at the first RJ connector 32 is the subscriber primary line at one or more of the secondary RJ connectors 34.

Figure 6:
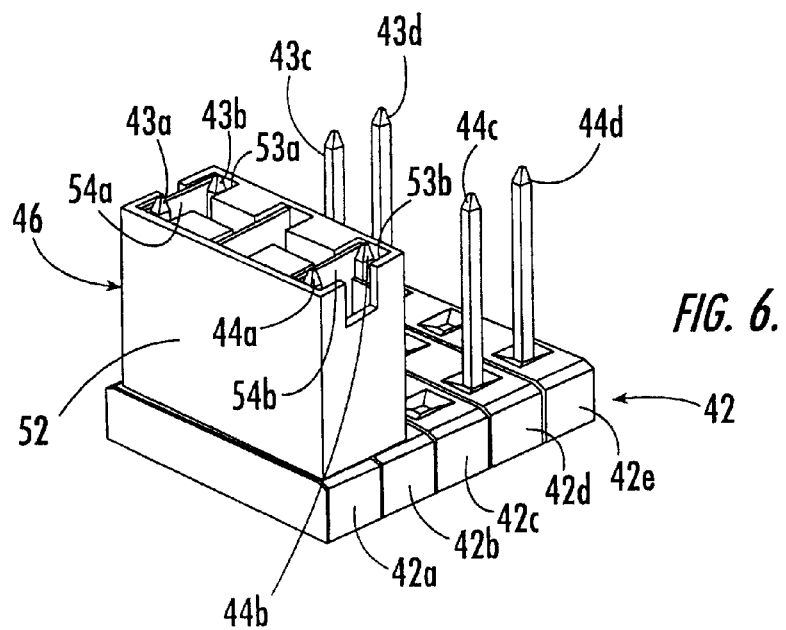
FIG. 6 is a perspective view of a portion of the terminal block and shunt device of FIG. 5 illustrating the shunt device in a user-selected position.

Referring now to FIG. 6, the terminal block 42 and shunt device 46 of FIG. 5 are illustrated in enlarged detail. The terminal block 42 includes a plurality of adjacent terminal strips 42a–42e. Terminal posts 43a, 43b, 44a, 44b extend outwardly from terminal strips 42a and 42b, as illustrated.

Similarly, terminal posts 43c, 43d, 44c, 44d extend outwardly from terminal strips 42d and 42e, as illustrated.

The illustrated shunt device 46 includes a housing 52 having spaced-apart receptacles 53a, 53b that are configured to receive adjacent pairs of terminal posts. For example, in the illustrated embodiment, receptacle 53a is configured to receive adjacent terminal posts 43a, 43b at the same time, or adjacent posts 43c, 43d at the same time. Similarly, receptacle 53b is configured to receive adjacent terminal posts 44a, 44b at the same time, or adjacent posts 44c, 44d at the same time. Conductive connectors 54a, 54b are disposed within each respective receptacle 53a, 53b as illustrated. Conductive connector 54a is configured to electrically connect terminal posts 43a and 43b when terminal posts 43a, 43b are within receptacle 53a, and to electrically connect terminal posts 43c and 43d when terminal posts 43c, 43d are within receptacle 53a. Conductive connector 54b is configured to electrically connect terminal posts 44a and 44b when terminal posts 44a, 44b are within receptacle 53b.

Figure 7:
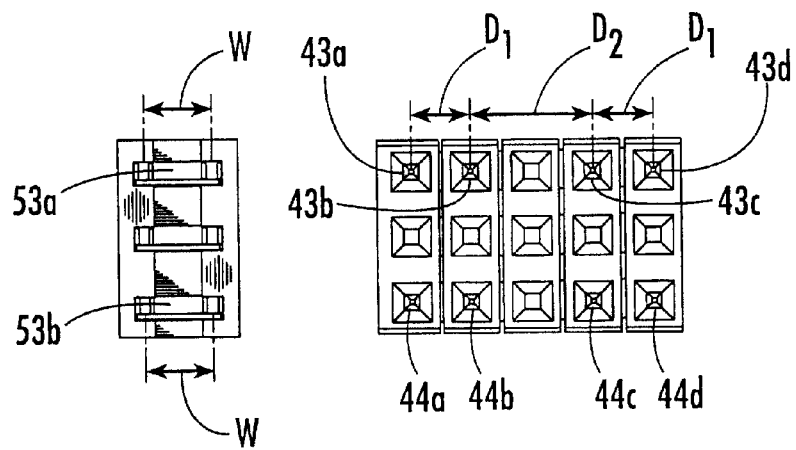
FIG. 7 is a schematic illustration of the distances between adjacent terminal posts of the terminal block of FIG. 6.

It is preferable that terminal posts 43b, 43c are spaced apart such that the shunt device 46 cannot electrically connect terminal posts 43b, 43c together. Similarly, it is preferable that terminal posts 44b, 44c are spaced apart such that the shunt device 46 cannot electrically connect terminal posts 44b, 44c together. This is illustrated schematically in FIG. 7 wherein the distance $D_2$ between terminal posts 43b, 44c (and between terminal posts 44b, 44c) is greater than the distance $D_1$ between terminal posts 43a, 43b and between terminal posts 43c, 43d. The width W of each receptacle 53a, 53b is less than $D_2$.

Exemplary terminal strips 42a–42e and shunt devices 46 which may be utilized to implement embodiments of the present invention are available from Samtec, Inc. (P.O. Box 1147, New Albany, Ind. 47151).

Figure 8:
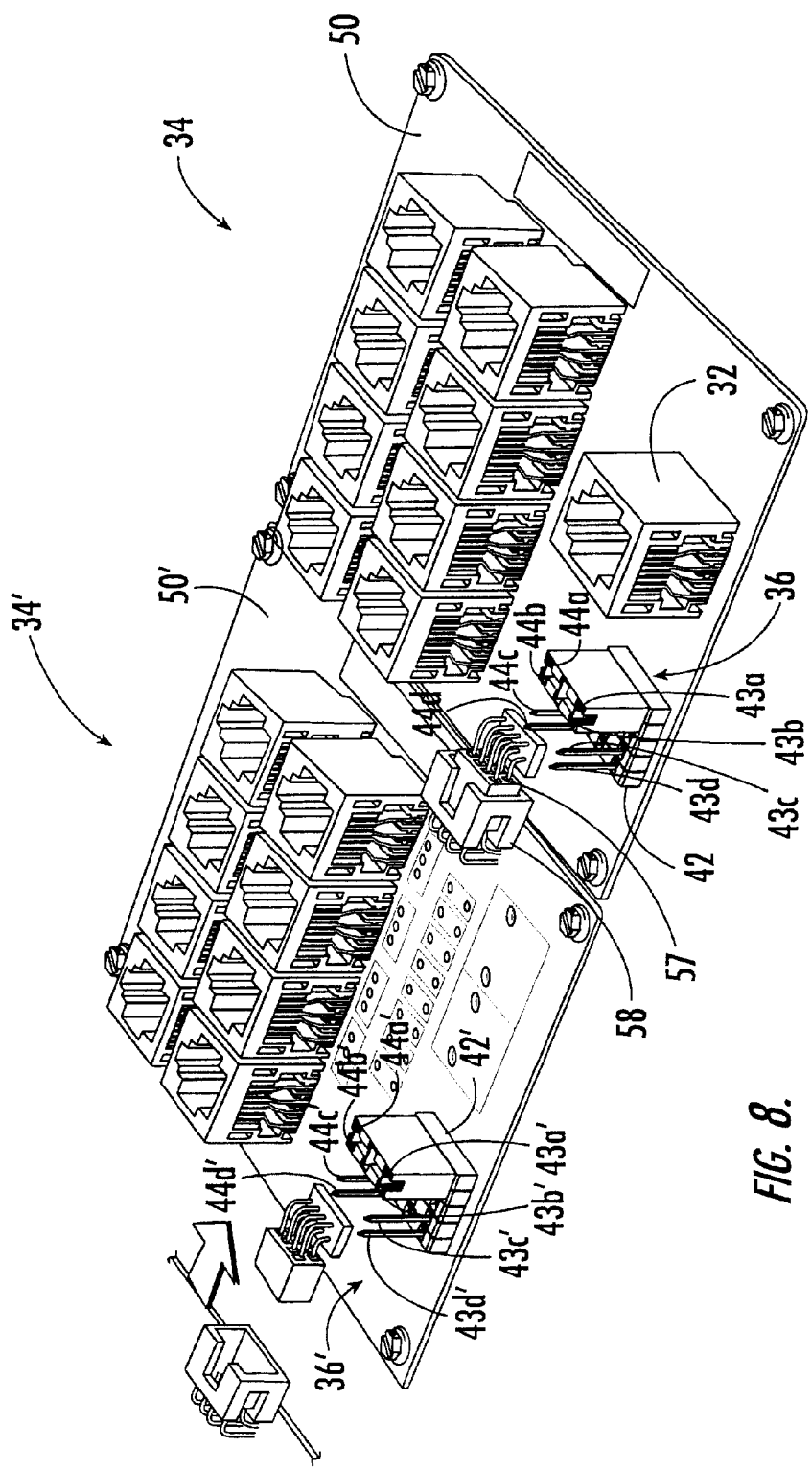
FIG. 8 is a perspective view of two printed circuit boards (PCBs) removably secured together, and illustrating a first RJ connector and a plurality of second RJ connectors on a first PCB, and a plurality of third RJ connectors on a second PCB, according to embodiments of the present invention.

According to another embodiment of the present invention, one or more telephone line distribution apparatus may be connected together, as illustrated in FIG. 8. In the illustrated embodiment, first and second PCBs 50, 50' are electrically connected via male and female connectors 57, 58.

A plurality of third RJ connectors 34' are mounted on the second PCB 50'. Each of the third RJ connectors 34' are RJ receptacles configured to receive an RJ plug of a respective subscriber line. One or more of the third RJ connectors 34' includes first tip and ring pins electrically connected to respective tip and ring wires of a subscriber primary telephone line, and second tip and ring pins electrically connected to respective tip and ring wires of a subscriber secondary telephone line.

A second switching device 36' is also mounted on the second PCB 50'. The second switching device 36' has first and second configurations, such that when the second switching device 36' is in the first configuration, the first incoming telephone line at the first RJ connector 32 becomes the subscriber primary telephone line at one or more of the third RJ connectors 34'. When the second switching device 36' is in the second configuration, the second incoming telephone line at the first RJ connector 32 becomes the subscriber primary telephone line at one or more of the third RJ connectors 34'.

The second switching device 36' includes a terminal block 42' having first, second, third, and fourth ring terminal posts 43a', 43b', 43c', 43d' arranged in a row in adjacent, spaced-apart relationship, as illustrated. The terminal block 42' also includes first, second, third, and fourth tip terminal posts 44a', 44b', 44c', 44d' arranged in adjacent, spaced-apart relationship, as illustrated. The second and fourth ring terminal posts 43b', 43d' are electrically connected to a first ring pin of one or more of the third RJ connectors 34'. The second and fourth tip terminal posts 44b', 44d' are electrically connected to a first tip pin of one or more of the third RJ connectors 34'.

The second switching device 36' also includes a second shunt device 46' that is, configured to be removably secured to the second terminal block 42' in first and second positions. In the first position, the shunt device 46' electrically connects the first and second ring terminal posts 43a', 43b' of the second terminal block 42' and electrically connects the first and second tip terminal posts 44a', 44b' of the second terminal block 42' so that a first incoming telephone line (38, FIG. 4) becomes the subscriber primary telephone line at one or more of the third RJ connectors 34'. (The second shunt device 46' is illustrated in the first position in FIG. 8.) In the second position, the second shunt device 46' electrically connects the third and fourth ring terminals 43c', 43d' of the second terminal block 42' and electrically connects the third and fourth tip terminals 44c', 44d' of the second terminal block 42' so that the second incoming telephone line (39, FIG. 4) becomes the subscriber primary telephone line 40 at one or more of the third RJ connectors 34'.

It is understood that the first and second terminal blocks 42, 42' of the first and second switching devices 36, 36' may have various numbers and configurations of terminal posts. For example, switching devices may be provided that allow a user to designate a primary line from any number of incoming telephone lines. The illustrated embodiments have been selected for clarity.

Figure 9:
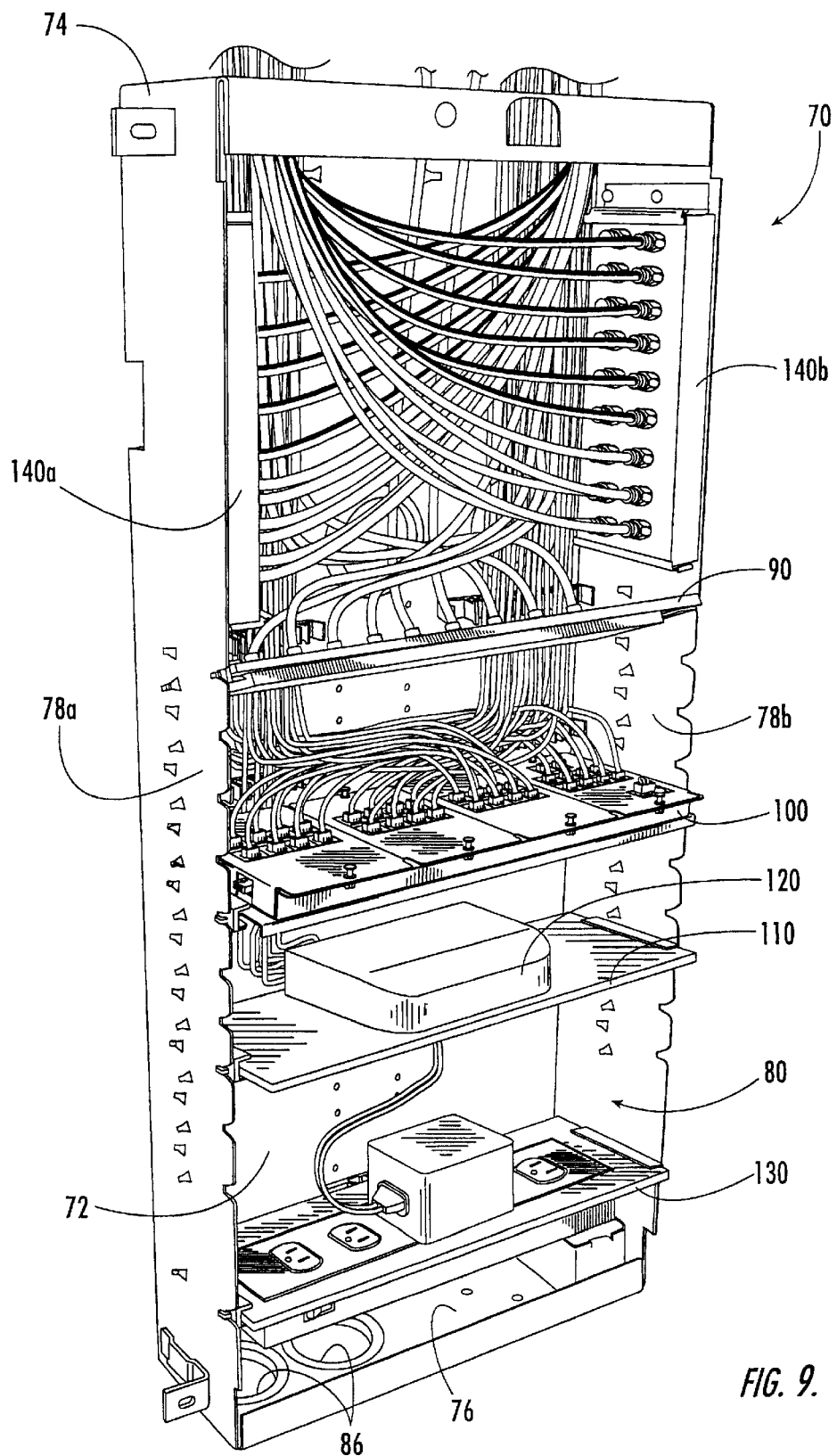
FIG. 9 is a perspective view of a cable distribution apparatus housing containing a plurality of cable distribution modules and including a telephone line distribution module according to embodiments of the present invention.

Referring now to FIG. 9, a cable distribution apparatus housing 70 in which telephone line distribution apparatus according to various embodiments of the present invention may be housed is illustrated. The illustrated housing 70 has an elongated, generally rectilinear configuration and may be configured to be mounted into (or onto) a building wall. The housing 70 includes a rear wall 72 that is joined to a forwardly projecting top wall 74, bottom wall 76 and pair of side walls 78a, 78b to define a forwardly open chamber 80. The illustrated housing 70 also includes various cable apertures 86 formed within the top, bottom and rear walls 74, 76, 72 through which various communications cables can be inserted into the chamber 80.

Figure 10:
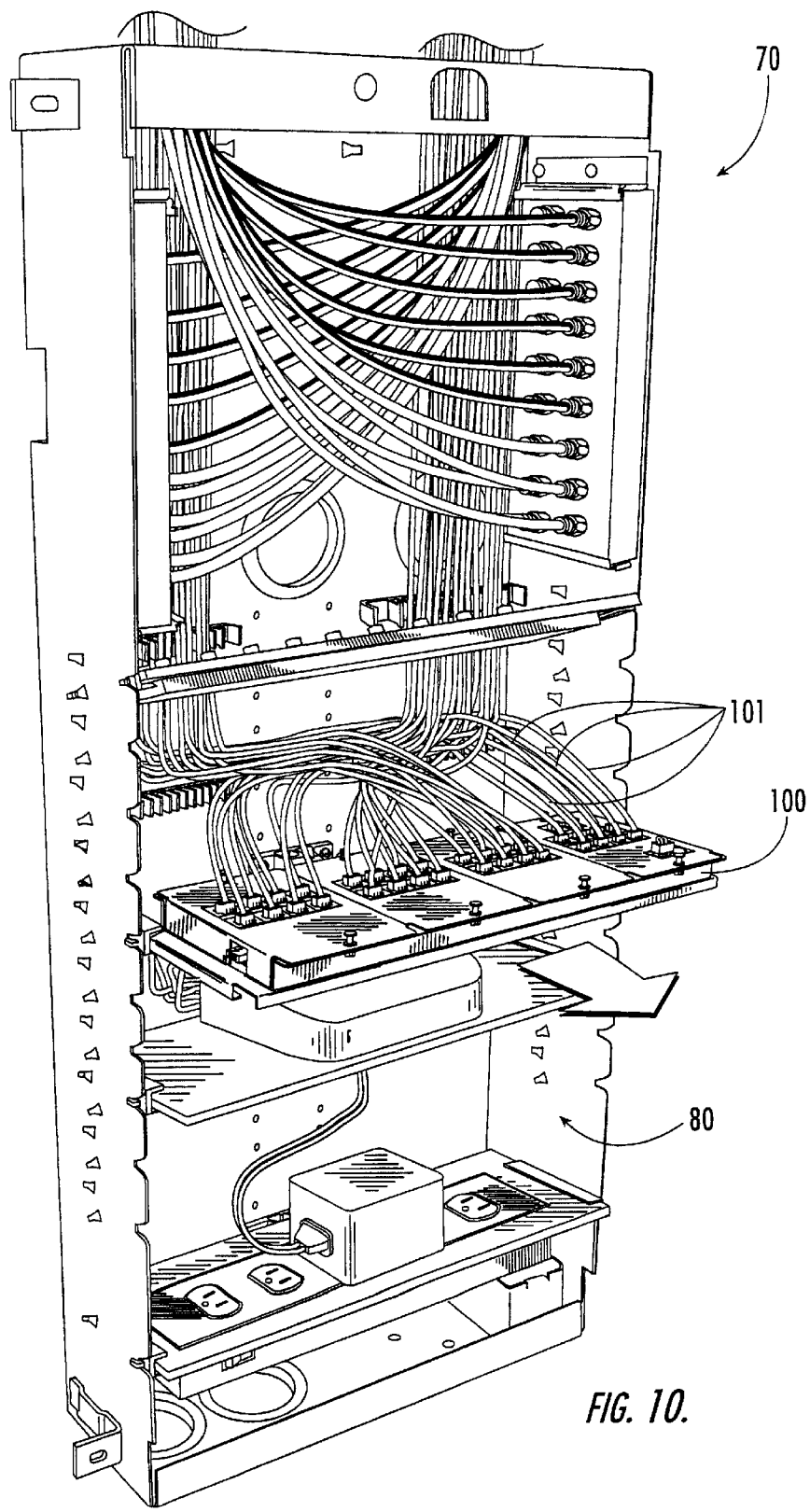
FIG. 10 is a perspective view of the cable distribution apparatus housing of FIG. 9 illustrating a telephone line distribution apparatus, according to embodiments of the present invention, being slidably removed from the housing.

Various components (e.g., trays and cable distribution modules) are removably secured within the chamber 80 in longitudinally spaced-apart relationship. The illustrated housing 70 includes the following slidably supported components disposed within the chamber 80: a video cable distribution module 90, a telephone line distribution module 100, a tray 110 having an ethernet hub 120 disposed thereon, and an electrical power module 130. In addition, video cable distribution modules 140a, 140b are slidably secured to respective side walls 78a, 78b, as illustrated. FIG. 10 illustrates the telephone line distribution module 100, being slidably removed from an installed position within the chamber 80 with a plurality of telephone line cables 101 connected thereto.

Figure 11:
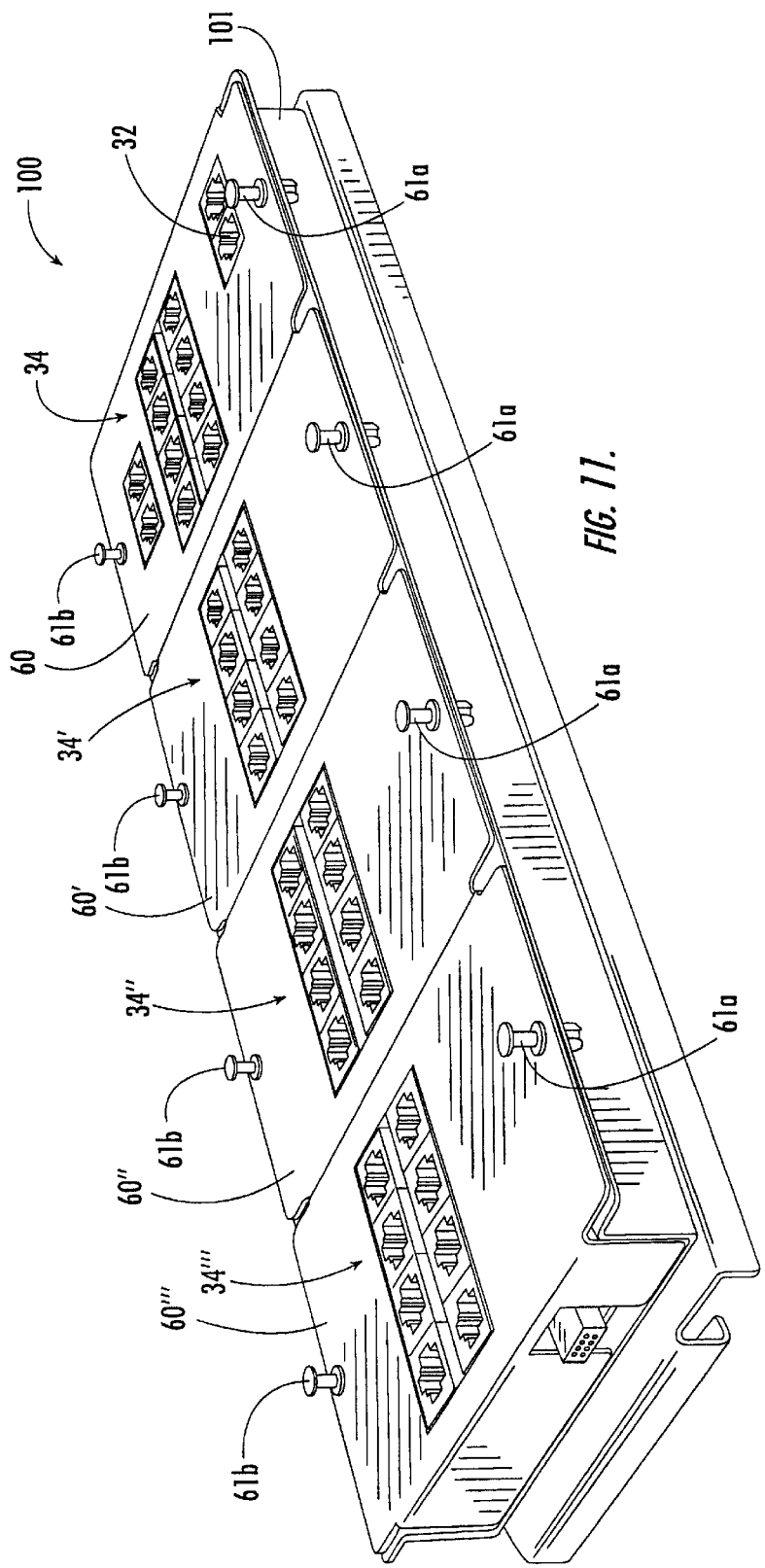
FIG. 11 is a perspective view of a telephone line distribution apparatus according to embodiments of the present invention and configured to be removably secured within the cable distribution apparatus housing of FIG. 9.
Figure 12:
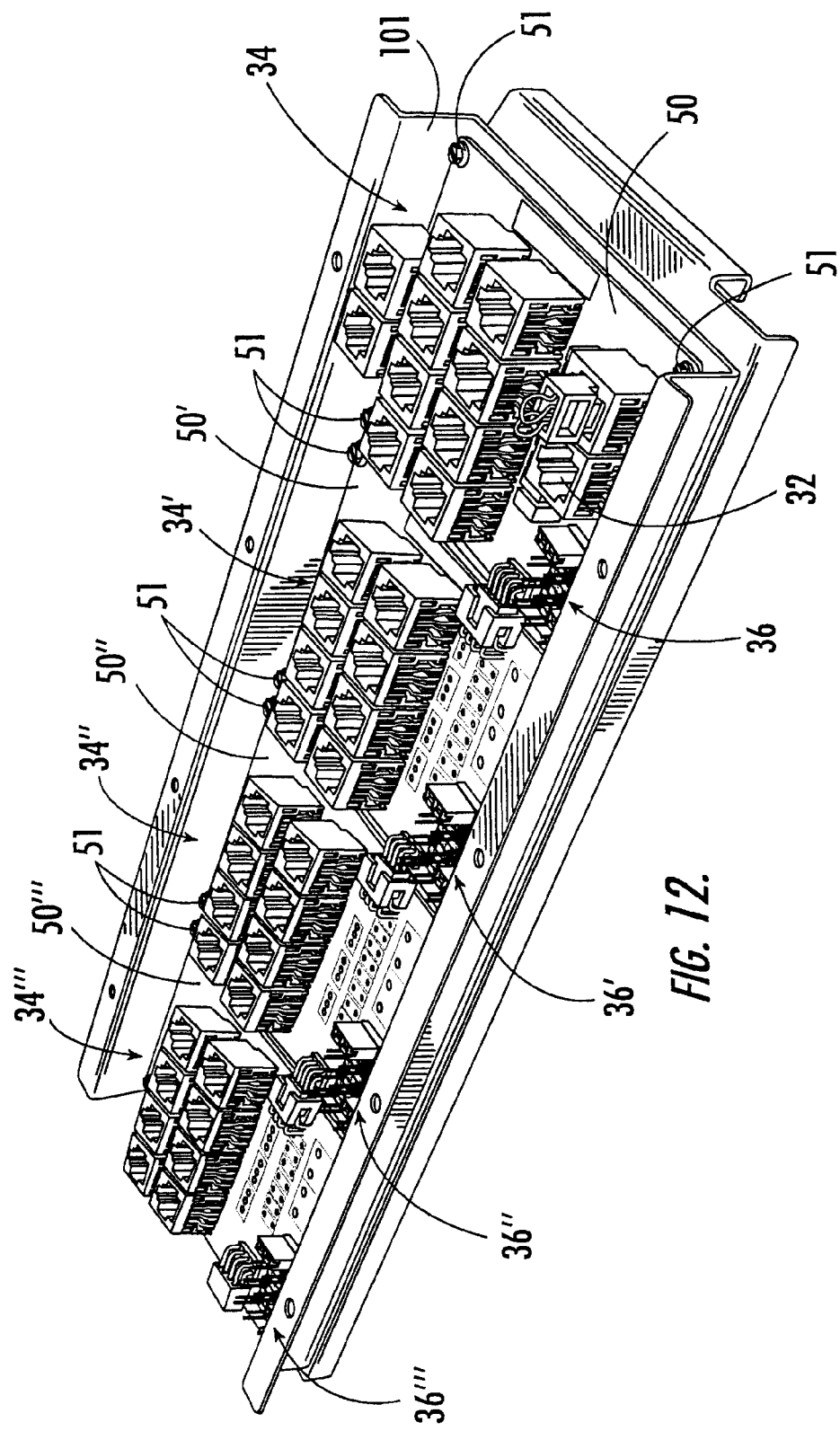
FIG. 12 is a perspective view of a telephone line distribution apparatus having a plurality of PCBs containing RJ connectors, terminal blocks, and shunt devices, according to embodiments of the present invention.
Figure 13:
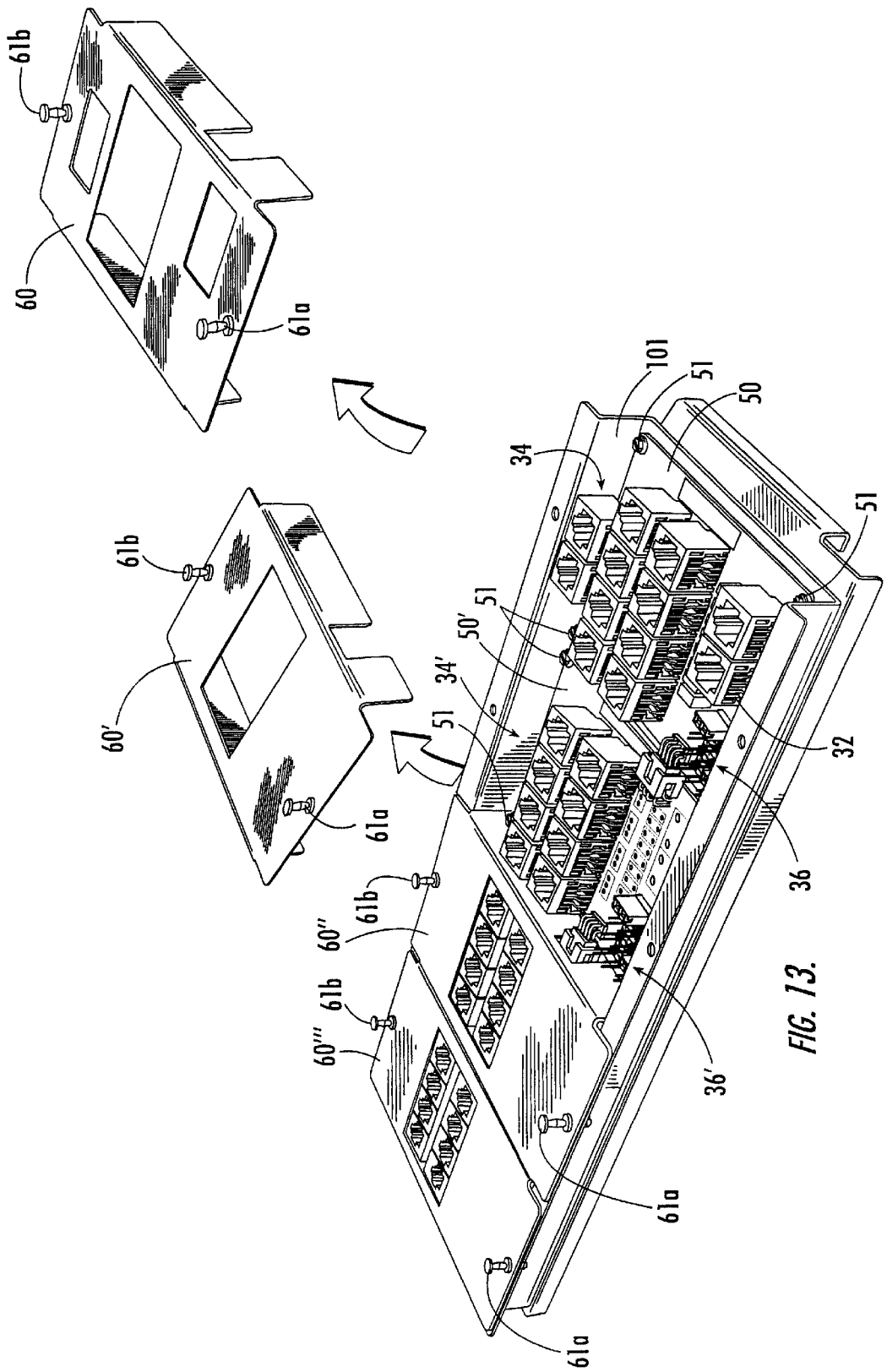
FIG. 13 is a perspective view of the telephone line distribution apparatus of FIG. 11 with two covers removed from respective PCBs.

Referring now to FIGS. 11–13, the telephone line distribution module 100 of FIG. 9 is illustrated in greater detail. The illustrated telephone line distribution module 100 includes a frame 101 to which multiple PCBs 50, 50', 50", 50''' are mounted via fasteners 51. A first RJ connector 32 is mounted to a first PCB 50 and is an RJ receptacle that is configured to receive an RJ plug of one to four incoming telephone lines. A plurality of second RJ connectors 34 are mounted on the first PCB 50. A plurality of third RJ connectors 34' are mounted on the second PCB 50'. A plurality of fourth RJ connectors 34" are mounted on the third PCB 50". A plurality of fifth RJ connectors 34''' are mounted on the fourth PCB 50'''. Each of the second, third, fourth, and fifth RJ connectors 34, 34', 34", 34''' are preferably RJ receptacles that are configured to receive respective RJ plugs of respective subscriber lines.

Also mounted to each PCB is a respective switching device. In the illustrated embodiment, switching device 36 is mounted to PCB 50, switching device 36' is mounted to PCB 50', switching device 36" is mounted to PCB 50", and switching device 36''' is mounted to PCB 50'''.

Overlying each respective PCB is a respective cover that is configured to be removably secured to the frame 101 by hand. For example, overlying PCB 50 is cover 60, overlying PCB 50' is cover 60', overlying PCB 50" is cover 60", and overlying PCB 50''' is cover 60'''. Each cover 60–60''' is removably secured to the frame 101 preferably using respective pairs of hand-actuated fasteners 61a, 61b. Exemplary hand-actuated fasteners are available from the Hartwell Corporation, 620A South Jefferson Street, Placentia, Calif. 92870. However, it is understood that the covers 60–60''' may be attached to the frame 101 in various ways.

Figure 14:
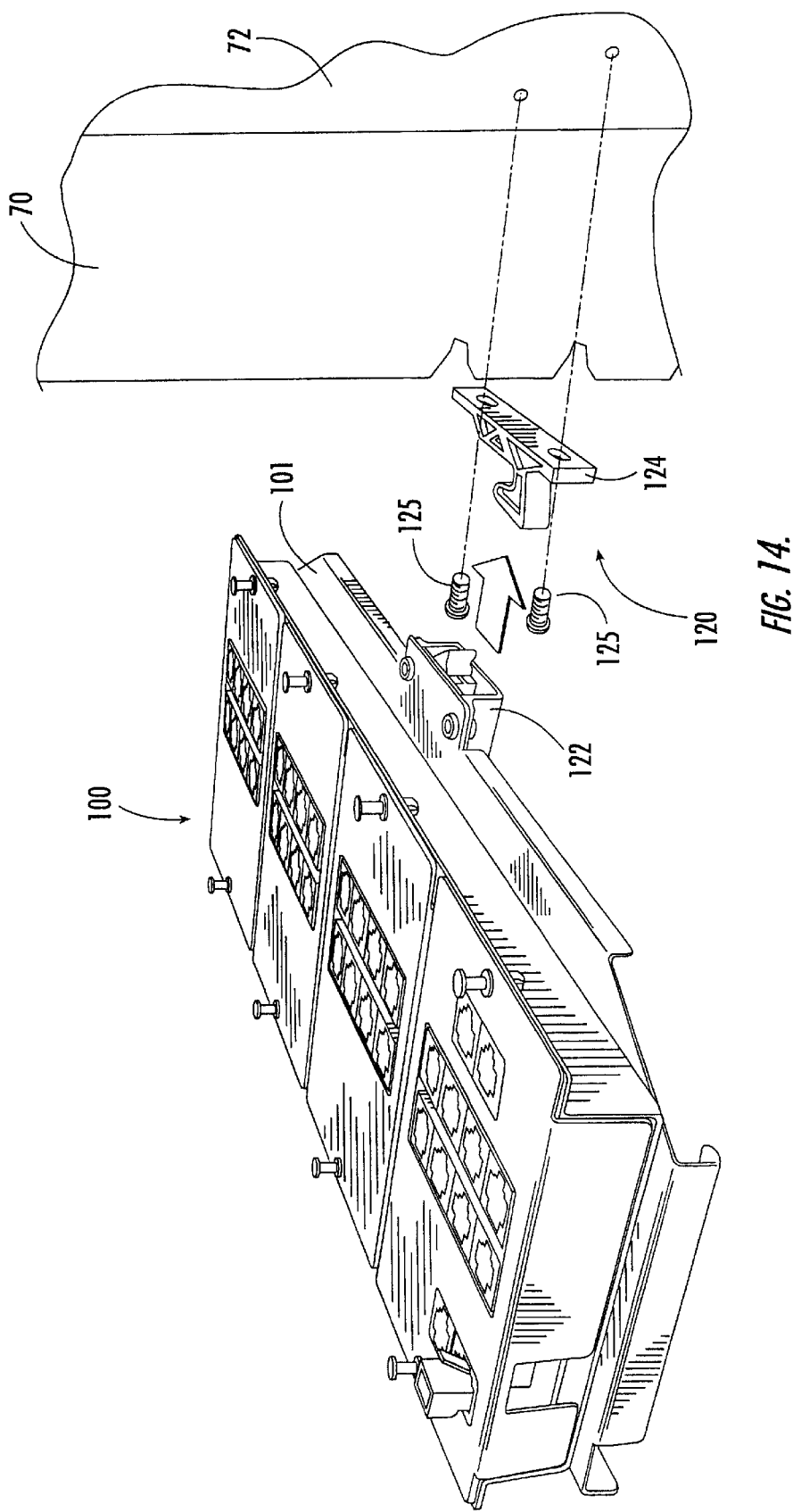
FIG. 14 is an exploded perspective view of a telephone line distribution module and locking mechanism that is configured to releasably secure the telephone line distribution module within the cable distribution apparatus housing according to an embodiment of the present invention.

Referring now to FIG. 14, a locking mechanism 120 that may be utilized to releasably secure the telephone line distribution module 100 within the chamber 80 is illustrated. The illustrated locking mechanism 120 includes a female portion 122 secured to the frame 101, and a male portion 124 secured to the rear wall 72 of the housing 70 via fasteners 125. However, it is understood that a different configuration of the female and male portions 122, 124 may also be utilized. For example, the female portion 122 may be secured to the rear wall 22 of the housing 70 via fasteners 125 and the male portion 124 may be secured to the telephone line distribution module 100.

Figure 15:
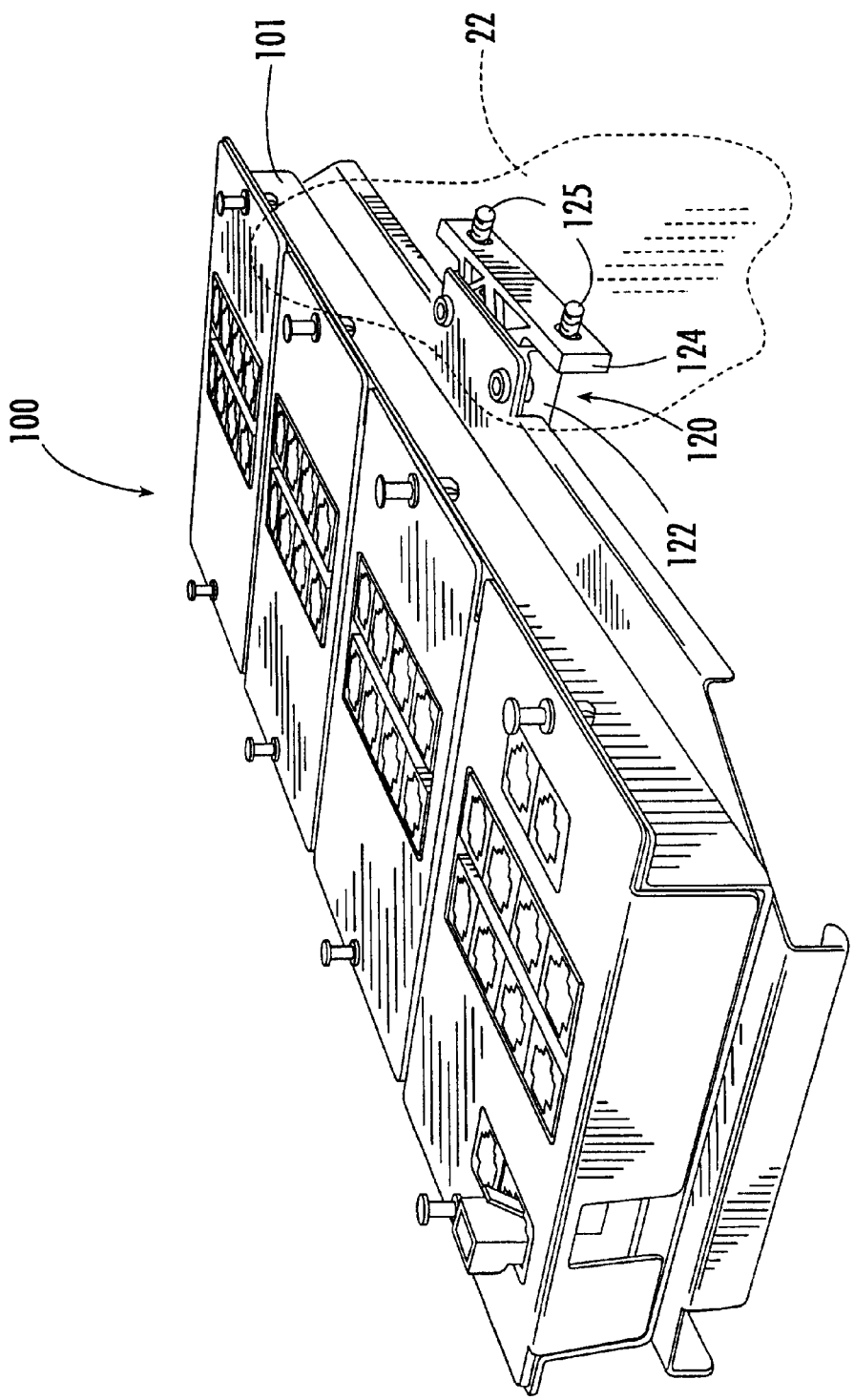
FIG. 15 is a perspective view of a telephone line distribution module releasably secured to a cable distribution apparatus housing wall (illustrated in phantom line) via the locking mechanism of FIG. 14.

In operation, when the telephone line distribution module 100 is slidably inserted within the housing 70 and moved towards the rear wall 72 of the housing 70, the female portion 122 of the locking mechanism 120 is configured to releasably receive the male portion 124 and hold the telephone line distribution module 100 securely to the rear wall 72 as illustrated in FIG. 15.

Preferably the female portion 122 of the locking mechanism 120 is configured to snugly retain the male portion 124 therewithin. However, it is also preferred that the engagement force of the female portion 122 can be overcome with a gentle pulling force exerted by a user. A particularly preferred type of locking mechanism 120 is available from Southco, Inc., 210 N. Brinton Lake Road, Concordville, Pa. 19331.

Figure 16:
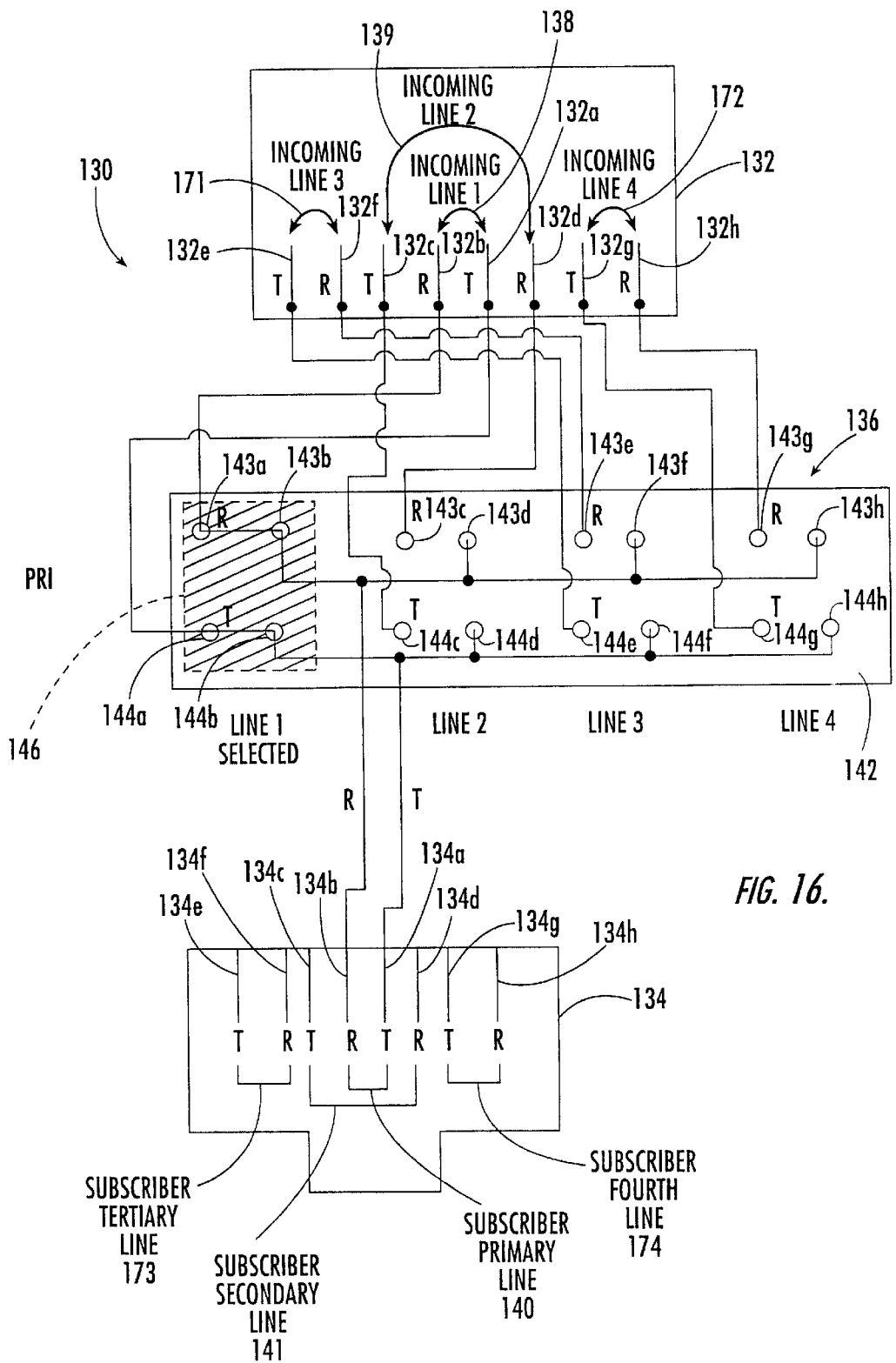
FIG. 16 is a schematic illustration of a telephone line distribution apparatus according to another embodiment of the present invention.

Referring now to FIG. 16, a telephone line distribution apparatus 130 according to another embodiment of the present invention is schematically illustrated. The telephone line distribution apparatus 130 includes a first RJ connector 132, a second RJ connector 134, and a switching device 136 that allows a subscriber to designate which of a plurality of incoming telephone lines is the subscriber's primary line. It is understood that embodiments of the present invention may include multiple second RJ connectors 134.

The first RJ connector 132 includes first tip and ring pins 132a, 132b that are electrically connected to respective tip and ring wires (not shown) of a first incoming telephone line 138; second tip and ring pins 132c, 132d that are electrically connected to respective tip and ring wires (not shown) of a second incoming telephone line 139; third tip and ring pins 132e, 132f that are electrically connected to respective tip and ring wires (not shown) of a third incoming telephone line 171; and fourth tip and ring pins 132g, 132h that are electrically connected to respective tip and ring wires (not shown) of a fourth incoming telephone line 172.

The second RJ connector 134 includes first tip and ring pins 134a, 134b that are electrically connected to respective tip and ring wires (not shown) of a subscriber primary telephone line 140; second tip and ring pins 134c, 134d that are electrically connected to respective tip and ring wires (not shown) of a subscriber secondary telephone line 141; third tip and ring pins 134e, 134f that are electrically connected to respective tip and ring wires (not shown) of a subscriber tertiary telephone line 173; and fourth tip and ring pins 134g, 134h that are electrically connected to respective tip and ring wires (not shown) of a subscriber fourth telephone line 174.

The illustrated switching device 136 has first, second, third, and fourth user-selectable configurations. When the switching device 136 is in the first configuration, the first incoming telephone line 138 becomes the subscriber primary telephone line 140 at the second RJ connector 134. When the switching device 136 is in the second configuration, the second incoming telephone line 139 becomes the subscriber primary telephone line 140 at the second RJ connector 134. When the switching device 136 is in the third configuration, the third incoming telephone line 171 becomes the subscriber primary telephone line 140 at the second RJ connector 134. When the switching device 136 is in the fourth configuration, the fourth incoming telephone line 172 becomes the subscriber primary telephone line 140 at the second RJ connector 134.

The switching device 136 includes a terminal block 142 having first, second, third, fourth, fifth, sixth, seventh, and eighth ring terminals 143a, 143b, 143c, 143d, 143e, 143f, 143g, 143h arranged in a row in adjacent, spaced-apart relationship, as illustrated. The terminal block 142 also includes first, second, third, fourth, fifth, sixth, seventh, and eighth tip terminals 144a, 144b, 144c, 144d, 144e, 144f, 144g, 144h arranged in adjacent, spaced-apart relationship, as illustrated. The second, fourth, sixth, and eighth ring terminals 143b, 143d, 143f, 143h are electrically connected to the first ring pin 134b at the second RJ connector 134. The second, fourth, sixth, and eighth tip terminals 144b, 144d, 144f, 144h are electrically connected to the first tip pin 134a at the second RJ connector 134.

The switching device 136 also includes a shunt device 146 that is configured to be removably secured to the terminal block 142 in first, second, third, and fourth positions. In the first position, the shunt device 146 electrically connects the first and second ring terminals 143a, 143b of the terminal block 142 and electrically connects the first and second tip terminals 144a, 144b of the terminal block 142 so that the first incoming telephone line 138 becomes the subscriber primary telephone line 140 at the second RJ connector 134. (The shunt device 146 is illustrated in the first position in FIG. 16.) In the second position, the shunt device 146 electrically connects the third and fourth ring terminals 143c, 143d of the terminal block 142 and electrically connects the third and fourth tip terminals 144c, 144d of the terminal block 142 so that the second incoming telephone line 139 becomes the subscriber primary telephone line 140 at the second RJ connector 134. In the third position, the shunt device 146 electrically connects the fifth and sixth ring terminals 143e, 143f of the terminal block 142 and electrically connects the fifth and sixth tip terminals 144e, 144f of the terminal block 142 so that the third incoming telephone line 171 becomes the subscriber primary telephone line 140 at the second RJ connector 134. In the fourth position, the shunt device 146 electrically connects the seventh and eighth ring terminals 143g, 143h of the terminal block 142 and electrically connects the seventh and eighth tip terminals 144g, 144h of the terminal block 142 so that the fourth incoming telephone line 172 becomes the subscriber primary telephone line 140 at the second RJ connector 134.

Preferably, the terminals are spaced apart as described above such that the shunt device 146 cannot electrically connect terminals other than as described above with respect to the four positions.

Figure 17:
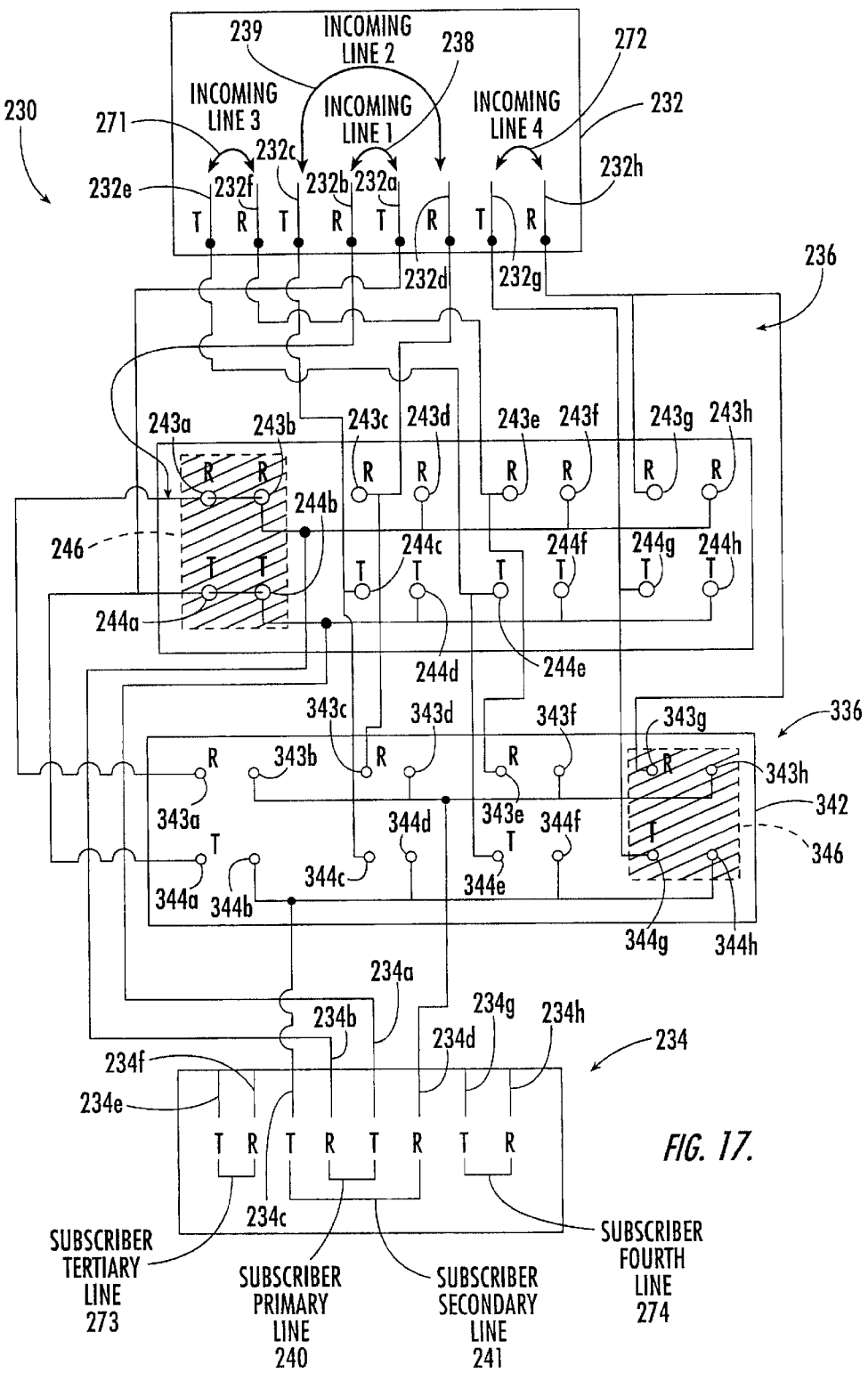
FIG. 17 is a schematic illustration of a telephone line distribution apparatus according to another embodiment of the present invention.

Referring now to FIG. 17, a telephone line distribution apparatus 230 according to another embodiment of the present invention is schematically illustrated. The telephone line distribution apparatus 230 includes a first RJ connector 232, a second RJ connector 234, and first and second switching devices 236, 336 that allow a subscriber to designate which of a plurality of incoming telephone lines is the subscriber's primary line and which is the secondary line. It is understood that embodiments of the present invention may include multiple second RJ connectors 234.

The first RJ connector 232 includes first tip and ring pins 232a, 232b that are electrically connected to respective tip and ring wires (not shown) of a first incoming telephone line 238; second tip and ring pins 232c, 232d that are electrically connected to respective tip and ring wires (not shown) of a second incoming telephone line 239; third tip and ring pins 232e, 232f that are electrically connected to respective tip and ring wires (not shown) of a third incoming telephone line 271; and fourth tip and ring pins 232g, 232h that are electrically connected to respective tip and ring wires (not shown) of a fourth incoming telephone line 272.

The second RJ connector 234 includes first tip and ring pins 234a, 234b that are electrically connected to respective tip and ring wires (not shown) of a subscriber primary telephone line 240; second tip and ring pins 234c, 234d that are electrically connected to respective tip and ring wires (not shown) of a subscriber secondary telephone line 241; third tip and ring pins 234e, 234f that are electrically connected to respective tip and ring wires (not shown) of a subscriber tertiary telephone line 273; and fourth tip and ring pins 234g, 234h that are electrically connected to respective tip and ring wires (not shown) of a subscriber fourth telephone line 274.

The illustrated first switching device 236 has first, second, third, and fourth user-selectable configurations. When in the first configuration, the first incoming telephone line 238 becomes the subscriber primary telephone line 240 at the second RJ connector 234. When the first switching device 236 is in the second configuration, the second incoming telephone line 239 becomes the subscriber primary telephone line 240 at the second RJ connector 234. When the first switching device 236 is in the third configuration, the third incoming telephone line 271 becomes the subscriber primary telephone line 240 at the second RJ connector 234. When the first switching device 236 is in the fourth configuration, the fourth incoming telephone line 272 becomes the subscriber primary telephone line 240 at the second RJ connector 234.

The illustrated second switching device 336 has first, second, third, and fourth user-selectable configurations. When in the first configuration, the first incoming telephone line 238 becomes the subscriber secondary telephone line 241 at the second RJ connector 234. When the second switching device 336 is in the second configuration, the second incoming telephone line 239 becomes the subscriber secondary telephone line 241 at the second RJ connector 234. When the second switching device 336 is in the third configuration, the third incoming telephone line 271 becomes the subscriber secondary telephone line 241 at the second RJ connector 234. When the second switching device 336 is in the fourth configuration, the fourth incoming telephone line 272 becomes the subscriber secondary telephone line 241 at the second RJ connector 234.

The first switching device 236 includes a first terminal block 242 having first, second, third, is fourth, fifth, sixth, seventh, and eighth ring terminals 243a, 243b, 243c, 243d, 243e, 243f, 243g, 243h arranged in a row in adjacent, spaced-apart relationship, as illustrated. The first terminal block 242 also includes first, second, third, fourth, fifth, sixth, seventh, and eighth tip terminals 244a, 244b, 244c, 244d, 244e, 244f, 244g, 244h arranged in adjacent, spaced-apart relationship, as illustrated. The second, fourth, sixth, and eighth ring terminals 243b, 243d, 243f, 243h are electrically connected to the first ring pin 234b at the second RJ connector 234. The second, fourth, sixth, and eighth tip terminals 244b, 244d, 244f, 244h are electrically connected to the first tip pin 234a at the second RJ connector 234.

The first switching device 236 also includes a first shunt device 246 that is configured to be removably secured to the terminal block 242 in first, second, third, and fourth positions. In the first position, the first shunt device 246 electrically connects the first and second ring terminals 243a, 243b of the first terminal block 242 and electrically connects the first and second tip terminals 244a, 244b of the first terminal block 242 so that the first incoming telephone line 238 becomes the subscriber primary telephone line 240 at the second RJ connector 234. (The first shunt device 246 is illustrated in the first position in FIG. 17.) In the second position, the first shunt device 246 electrically connects the third and fourth ring terminals 243c, 243d of the first terminal block 242 and electrically connects the third and fourth tip terminals 244c, 244d of the first terminal block 242 so that the second incoming telephone line 239 becomes the subscriber primary telephone line 240 at the second RJ connector 234. In the third position, the first shunt device 246 electrically connects the fifth and sixth ring terminals 243e, 243f of the first terminal block 242 and electrically connects the fifth and sixth tip terminals 244e, 244f of the first terminal block 242 so that the third incoming telephone line 271 becomes the subscriber primary telephone line 240 at the second RJ connector 234. In the fourth position, the first shunt device 246 electrically connects the seventh and eighth ring terminals 243g, 243h of the terminal block 242 and electrically connects the seventh and eighth tip terminals 244g, 244h of the first terminal block 242 so that the fourth incoming telephone line 272 becomes the subscriber primary telephone line 240 at the second RJ connector 234.

The second switching device 236 includes a second terminal block 342 having first, second, third, fourth, fifth, sixth, seventh, and eighth ring terminals 343a, 343b, 343c, 343d, 343e, 343f, 343g, 343h arranged in a row in adjacent, spaced-apart relationship, as illustrated. The second terminal block 242 also includes first, second, third, fourth, fifth, sixth, seventh, and eighth tip terminals 344a, 344b, 344c, 344d, 344e, 344f, 344g, 344h arranged in adjacent, spaced-apart relationship, as illustrated. The second, fourth, sixth, and eighth ring terminals 343b, 343d, 343f, 343h are electrically connected to the second ring pin 234d at the second RJ connector 234. The second, fourth, sixth, and eighth tip terminals 344b, 344d, 344f, 344h are electrically connected to the second tip pin 234c at the second RJ connector 234.

The second switching device 336 also includes a second shunt device 346 that is configured to be removably secured to the terminal block 342 in first, second, third, and fourth positions. In the first position, the second shunt device 346 electrically connects the first and second ring terminals 343a, 343b of the second terminal block 342 and electrically connects the first and second tip terminals 344a, 344b of the second terminal block 342 so that the first incoming telephone line 238 becomes the subscriber secondary telephone line 241 at the second RJ connector 234. (The second shunt device 346 is illustrated in the fourth position in FIG. 17.) In the second position, the second shunt device 346 electrically connects the third and fourth ring terminals 343c, 343d of the second terminal block 342 and electrically connects the third and fourth tip terminals 344c, 344d of the second terminal block 342 so that the second incoming telephone line 239 becomes the subscriber secondary telephone line 241 at the second RJ connector 234. In the third position, the second shunt device 346 electrically connects the fifth and sixth ring terminals 343e, 343f of the second terminal block 342 and electrically connects the fifth and sixth tip terminals 344e, 344f of the second terminal block 342 so that the third incoming telephone line 271 becomes the subscriber secondary telephone line 241 at the second RJ connector 234. In the fourth position, the second shunt device 346 electrically connects the seventh and eighth ring terminals 343g, 343h of the second terminal block 342 and electrically connects the seventh and eighth tip terminals 344g, 344h of the second terminal block 342 so that the fourth incoming telephone line 272 becomes the subscriber secondary telephone line 241 at the second RJ connector 234.

Figure 18:
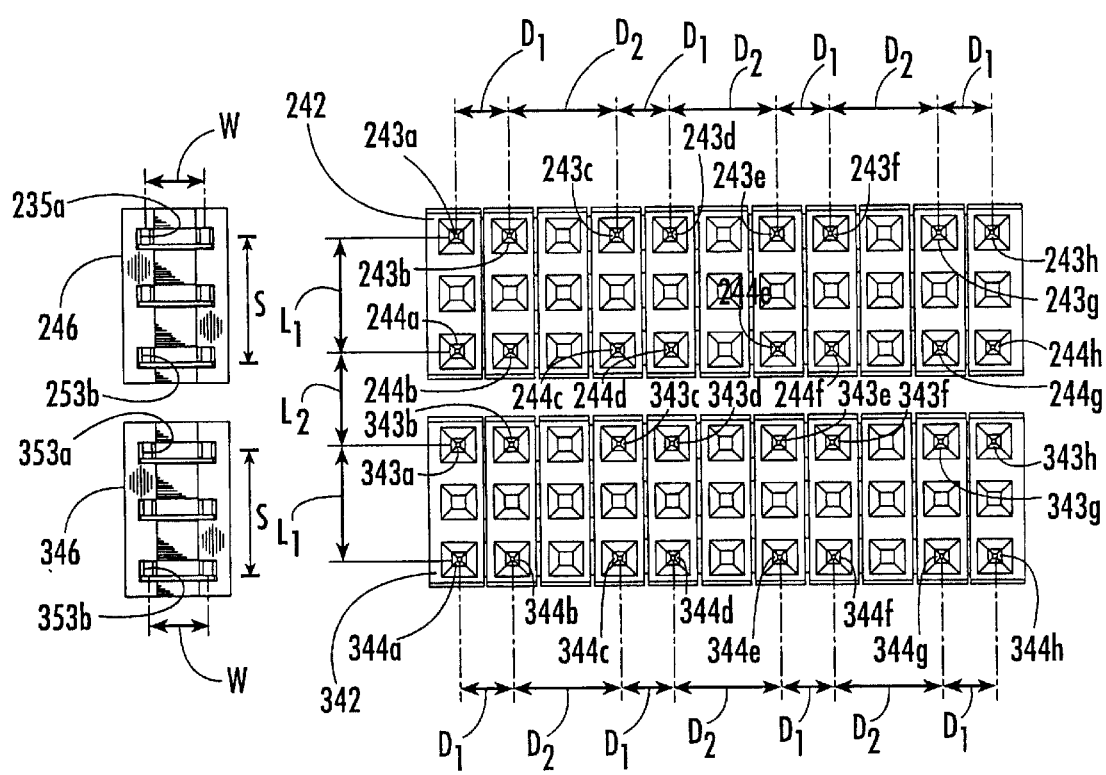
FIG. 18 is a schematic illustration of the distances between adjacent terminal posts of adjacent terminal blocks, according to an embodiment of the present invention.

It is preferable that terminal posts 243b and 243c, 243d and 243e, and 243f and 243g are spaced apart such that the first shunt device 246 cannot electrically connect terminal posts 243b and 243c, 243d and 243e, and 243f and 243g together. Similarly, it is preferable that terminal posts 244b and 244c, 244d and 244e, and 244f and 244g are spaced apart such that the first shunt device 246 cannot electrically connect terminal posts 244b and 244c, 244d and 244e, and 244f and 244g together. This is illustrated schematically in FIG. 18 wherein, for the first terminal block 242, the distance $D_2$ between terminal posts 243b and 243c, 243d and 243e, and 243f and 243g (and between terminal posts 244b and 244c, 244d and 244e, and 244f and 244g) is greater than the distance $D_1$ between terminal posts 243a and 243b, 243c and 243d, 243e and 243f, and 243g and 243h (and between terminal posts 244a and 244b, 244c and 244d, 244e and 244f, and 244g and 244h).

It is also preferable that terminal posts 343b and 343c, 343d and 343e, and 343f and 343g are spaced apart such that the second shunt device 346 cannot electrically connect terminal posts 343b and 343c, 343d and 343e, and 343f and 343g together. Similarly, it is preferable that terminal posts 344b and 344c, 344d and 344e, and 344f and 344g are spaced apart such that the second shunt device 346 cannot electrically connect terminal posts 344b and 344c, 344d and 344e, and 344f and 344g together. This is illustrated schematically in FIG. 18 wherein, for the second terminal block 342, the distance $D_2$ between terminal posts 343b and 343c, 343d and 343e, and 343f and 343g (and between terminal posts 344b and 344c, 344d and 344e, and 344f and 344g) is greater than the distance $D_1$ between terminal posts 343a and 343b, 343c and 343d, 343e and 343f, and 343g and 343h (and between terminal posts 344a and 344b, 344c and 344d, 344e and 344f, and 344g and 344h).

Additionally, it is preferable that the first and second terminal blocks 242, 342 are spaced apart such that the first shunt device 246 cannot electrically connect terminals from the first and second terminal blocks 242, 342 at the same time, and such that the second shunt device 346 cannot electrically connect terminals from the first and second terminal blocks 242, 342 at the same time. This is illustrated schematically in FIG. 18 wherein the distance between terminal posts 244a and 343a(represented by $L_2$) is shorter than the distance between terminal posts 243a and 244a (represented by $L_1$) and between terminal posts 343a and 344a (also represented by $L_1$). The space between receptacles 253a and 253b (represented by S) in the first shunt device 246 is greater than $L_2$. Similarly, the space between receptacles 353a and 353b (represented by S) in the second shunt device 346 is greater than $L_2$.

DSL technology involves providing high-bandwidth data transfer over ordinary copper telephone lines. Variations of DSL, referred to as "xDSL", include ADSL, HDSL, and RADSL. As used herein, the term "DSL" shall include all variations of DSL (i.e., xDSL) Most DSL technologies require a signal splitter to separate DSL signals from voice signals carried by an incoming telephone line. According to additional embodiments of the present invention, a telephone line distribution apparatus may include an integrated Digital Subscriber Line (DSL) splitter function.

Figure 19:
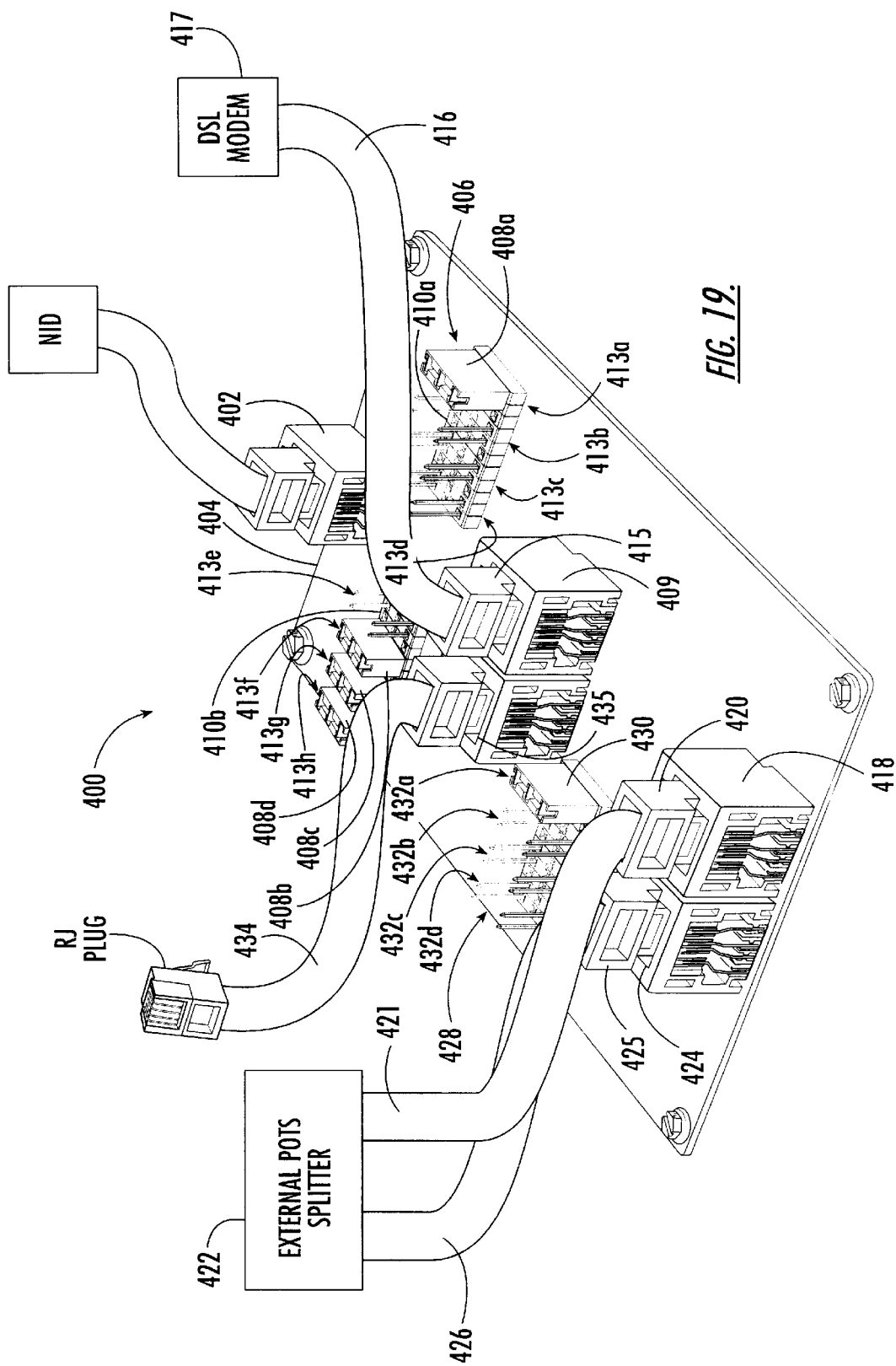
FIG. 19 is a schematic illustration of a telephone line distribution apparatus having DSL signal splitting capabilities according to another embodiment of the present invention.

Referring to FIG. 19, a telephone line distribution apparatus 400 having DSL signal splitting capabilities, according to an embodiment of the present invention, is illustrated. The illustrated telephone line distribution apparatus 400 includes an RJ connector 402 mounted to a printed circuit board (PCB) 404. The RJ connector 402 is an RJ receptacle that is configured to receive an RJ plug of an electrical cable, such as a Category 5 cable, carrying one to four incoming telephone lines (typically from a NID). The RJ connector 402 includes first tip and ring pins (not shown) electrically connected to respective tip and ring wires of a first incoming telephone line, second tip and ring pins (not shown) electrically connected to respective tip and ring wires of a second incoming telephone line, third tip and ring pins (not shown) electrically connected to respective tip and ring wires of a third incoming telephone line as described above, and fourth tip and ring pins (not shown) electrically connected to respective tip and ring wires of a fourth incoming telephone line. One of the four incoming telephone lines carries DSL signals in addition to voice telephone signals.

A switching device 406 is also mounted to the PCB 404 and is configured to identify which one of the incoming telephone lines is carrying DSL signals. The illustrated switching device 406 is a terminal block and shunt device assembly similar to that described above. In the illustrated embodiment, the first incoming telephone line is identified as the incoming telephone line that carries DSL signals in addition to voice signals by the position of the first shunt device 408a on the terminal block 410a. The first shunt device 408a electrically connects the first set of tip and ring terminals 413a. The second, third and fourth incoming telephone lines are identified as carrying only voice signals by the position of the second, third, and fourth shunt devices 408b, 408c, 408d on the terminal block 410b. The second, third, and fourth shunt devices 408b, 408c, 408d electrically connect the respective sixth, seventh, and eighth sets of tip and ring terminals 413f, 413g, 413h, as illustrated.

Another RJ connector 409 is mounted on the PCB adjacent the first switching device 406, and receives an RJ plug 415 connected to an electrical cable 416, as illustrated. The electrical cable 416 is connected to an external DSL modem 417. The shunt device 408a electrically connects the first incoming telephone line to the RJ connector 409 and, thus, to the external DSL modem 417. The shunt device 408a also electrically connects the first incoming telephone line to another RJ connector 418 that receives an RJ plug 420 connected to an electrical cable 421, as illustrated. The electrical cable 421 is connected to an external POTS (Plain Old Telephone System) splitter 422. The POTS splitter 422 filters the DSL signals from the voice signals of the first incoming telephone line. POTS splitters are well known to those of skill in the art and need not be described further herein. Another RJ connector 424 is mounted on the PCB adjacent RJ connector 418 and receives an RJ plug 425 connected to an electrical cable 426 from the external POTS splitter, as illustrated. The electrical cable 426 returns the first incoming line to the RJ connector 424 with the DSL signals separated therefrom.

Another switching device 428 is mounted to the PCB 404 and is configured to combine the first incoming telephone line containing only voice signals with the other incoming telephone lines. The illustrated switching device 428 is a terminal block and shunt device assembly as described above. In the illustrated embodiment, the shunt device 430 electrically connects the first set of tip and ring terminals 432a. Accordingly, an electrical cable 434 electrically connected to an RJ connector 435 contains all four incoming telephone lines that carry voice signals only.

Figure 20:
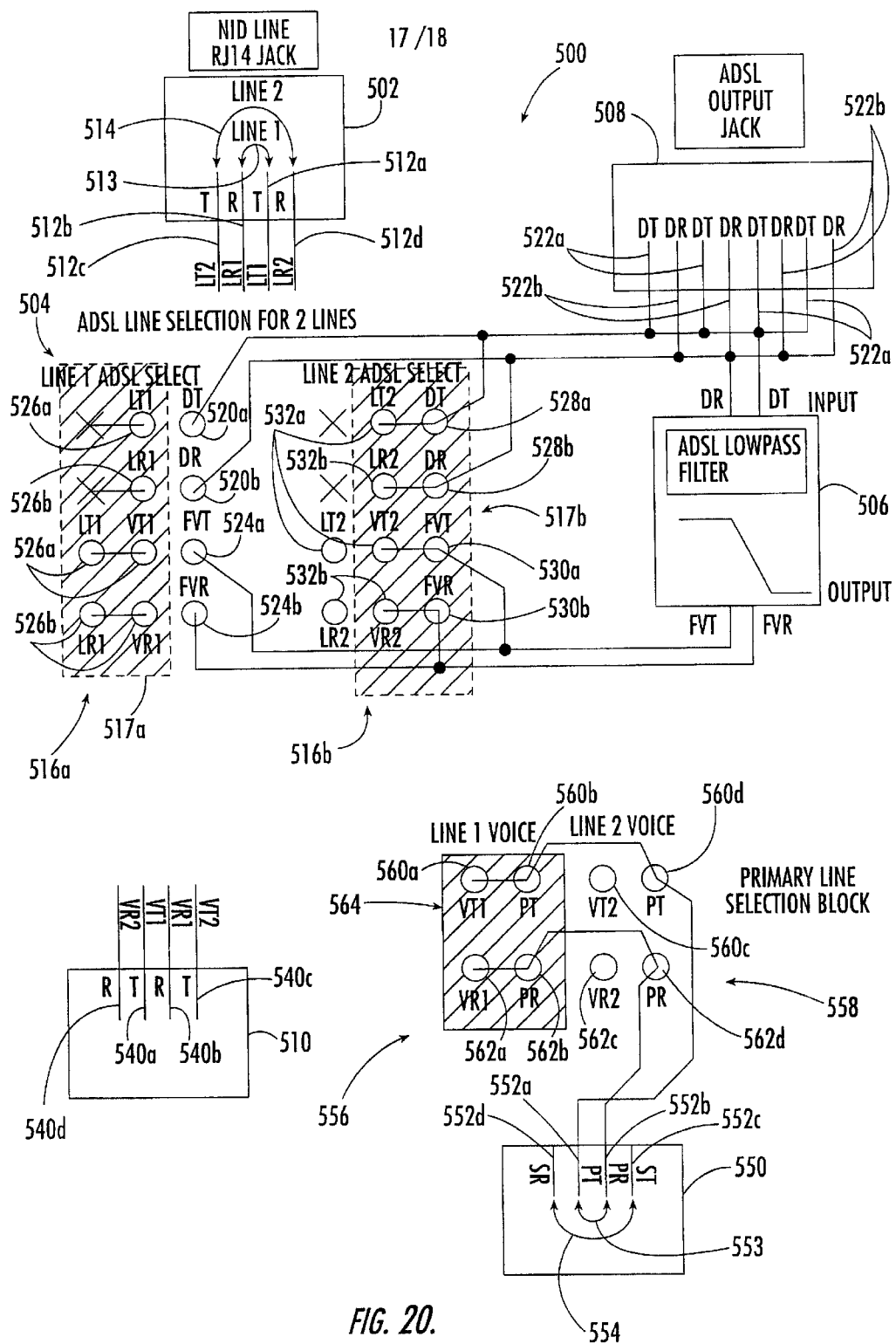
FIGS. 20 and 21 are schematic illustrations of a telephone line distribution apparatus having DSL signal splitting capabilities for two incoming telephone lines and four incoming telephone lines, respectively, according to other embodiments of the present invention.

Referring now to FIG. 20, a telephone line distribution apparatus 500 having DSL signal splitting capabilities, according to a preferred embodiment of the present invention, is illustrated schematically. The illustrated telephone line distribution apparatus 500 includes a first RJ connector 502, a first switching device 504 that identifies which one of the first and second incoming telephone lines is carrying DSL signals, a splitter 506 configured to separate DSL signals and voice telephone signals from an identified one of the first and second incoming telephone lines, a second RJ connector 508 (e.g., a DSL output jack) electrically connected to the splitter 506 that receives DSL signals that have been separated by the splitter 506 from an identified one of the first and second incoming telephone lines, and a third RJ connector 510 electrically connected to the splitter 506 and to the first RJ connector 502 to receive the first and second incoming telephone lines that carry voice telephone signals only.

The first RJ connector 502 is preferably an RJ receptacle (e.g., an RJ-14 receptacle) that includes first tip and ring pins 512a, 512b that are electrically connected to respective tip and ring wires (not shown) of a first incoming telephone line 513, and second tip and ring pins 512c, 512d electrically connected to respective tip and ring wires of a second incoming telephone line 514, wherein one of the first and second incoming telephone lines 513, 514 carries DSL signals in addition to voice telephone signals. The first and second incoming telephone lines 513, 514 typically originate from a NID as described previously.

The illustrated first switching device 504 includes first and second terminal blocks 516a, 516b associated with the first and second incoming telephone lines 513, 514, and respective first and second shunt devices 517a, 517b. The shunt devices 517a, 517b are positionable by a user to indicate which incoming telephone line contains DSL signals in addition to voice signals.

The first terminal block 516a includes a pair of adjacent, spaced-apart DSL signal tip and ring terminals 520a, 520b electrically connected to a plurality of respective tip and ring terminals of the second RJ connector 508, a pair of adjacent, spaced-apart voice signal tip and ring terminals 524a, 524b electrically connected to the splitter 506, and at least one pair of tip and ring terminals 526a, 526b electrically connected to the first tip and ring pins of the first RJ connector 502. The second terminal block 516b includes a pair of adjacent, spaced-apart DSL signal tip and ring terminals 528a, 528b electrically connected to a plurality of respective tip and ring terminals of the second RJ connector 508, a pair of adjacent, spaced-apart voice signal tip and ring terminals 530a, 530b electrically connected to the splitter 506, and at least one pair of tip and ring terminals 532a, 532b electrically connected to the second tip and ring pins of the first RJ connector 502.

The first shunt device 517a is configured to be removably secured to the first terminal block 516a in first and second positions, such that, when in the first position, the first incoming telephone line 513 is identified as carrying only voice telephone signals, and when in the second position, the first incoming telephone line 513 is identified as carrying both voice telephone signals and DSL signals. In the illustrated embodiment, the first shunt device 517a is in the first position which indicates that the first incoming telephone line 513 contains only voice signals.

The second shunt device 517b is configured to be removably secured to the second terminal block 516b in first and second positions, such that, when in the first position, the second incoming telephone line 514 is identified as carrying only voice telephone signals, and when in the second position, the second incoming telephone line 514 is identified as carrying both voice telephone signals and DSL signals. In the illustrated embodiment, the second shunt device 517b is in the second position which indicates that the second incoming telephone line 514 contains both DSL signals and voice signals.

The second RJ connector 508 is electrically connected to the splitter 506 and receives DSL signals that have been separated by the splitter 506 from the first or second incoming telephone lines 513, 514. An electrical cable (not shown) in communication with the second RJ connector 508 can provide the separated DSL signals to a DSL modem, as would be understood by those of skill in the art.

The third RJ connector 510 is electrically connected to the splitter 506 and to the first RJ connector 502 and includes first tip and ring pins 540a, 540b electrically connected to the first incoming telephone line 513, and second tip and ring pins 540c, 540d electrically connected to the second incoming telephone line 514. The first and second incoming telephone lines 513, 514 at the third RJ connector 510, however, carry voice telephone signals only.

According to another embodiment of the telephone line distribution apparatus 500, one or more fourth RJ connectors 550 are provided and each fourth RJ connector 550 includes first tip and ring pins 552a, 552b electrically connected to respective tip and ring wires (not shown) of a subscriber primary telephone line 553, and second tip and ring pins 552c, 552d electrically connected to respective tip and ring wires (not shown) of a subscriber secondary telephone line 554. Although only one fourth RJ connector 550 is illustrated, it is understood that a plurality of fourth RJ connectors 550 may be utilized in accordance with embodiments of the present invention.

A second switching device 556 is also provided and has first and second user-selectable configurations. When the second switching device 556 is in the first configuration, the first incoming telephone line 513 becomes the subscriber primary telephone line 553 at the fourth RJ connector 550. When the second switching device 556 is in the second configuration, the second incoming telephone line 514 becomes the subscriber primary telephone line 553 at the fourth RJ connector 550.

The illustrated second switching device 556 includes a third terminal block 558 having first, second, third, and fourth ring terminals 560a, 560b, 560c, 560d arranged in a row in adjacent, spaced-apart relationship, as illustrated. The third terminal block 558 also includes first, second, third, and fourth tip terminals 562a, 562b, 562c, 562d arranged in a row in adjacent, spaced-apart relationship, as illustrated. The second and fourth ring terminals 562b, 562d are electrically connected to the first ring pin 552b at the fourth RJ connector 550. The second and fourth tip terminals 560b, 560d are electrically connected to the first tip pin 552a at the fourth RJ connector 550.

The second switching device 556 also includes a third shunt device 564 that is configured to be removably secured to the third terminal block 558 in first and second positions. In the first position, the third shunt device 564 electrically connects the first and second ring terminals 562a, 562b of the third terminal block 558 and electrically connects the first and second tip terminals 560a, 560b of the third terminal block 558 so that the first incoming telephone line 513 becomes the subscriber primary telephone line 553 at the fourth RJ connector 550. (The third shunt device 564 is illustrated in the first position in FIG. 20.) In the second position, the third shunt device 564 electrically connects the third and fourth ring terminals 562c, 562d of the third terminal block 558 and electrically connects the third and fourth tip terminals 560c, 560d of the third terminal block 558 so that the second incoming telephone line 514 becomes the subscriber primary telephone line 553 at the fourth RJ connector 550.

It is understood that embodiments of the present invention may include other types of switching devices that serve the functions of the first and second switching devices 504, 556. For example, other switching devices may be used to selectively connect the various terminals as described herein including, but not limited to, single pole single throw switches, single pole double throw switches, and other mechanically and/or electrically activated switches. In addition, the first, second, third, and fourth RJ connectors 502, 508, 510, 550 and the first and second switching devices 504, 556 may be mounted on the same printed circuit board (PCB), or on different PCBs electrically connected together.

Figure 21:
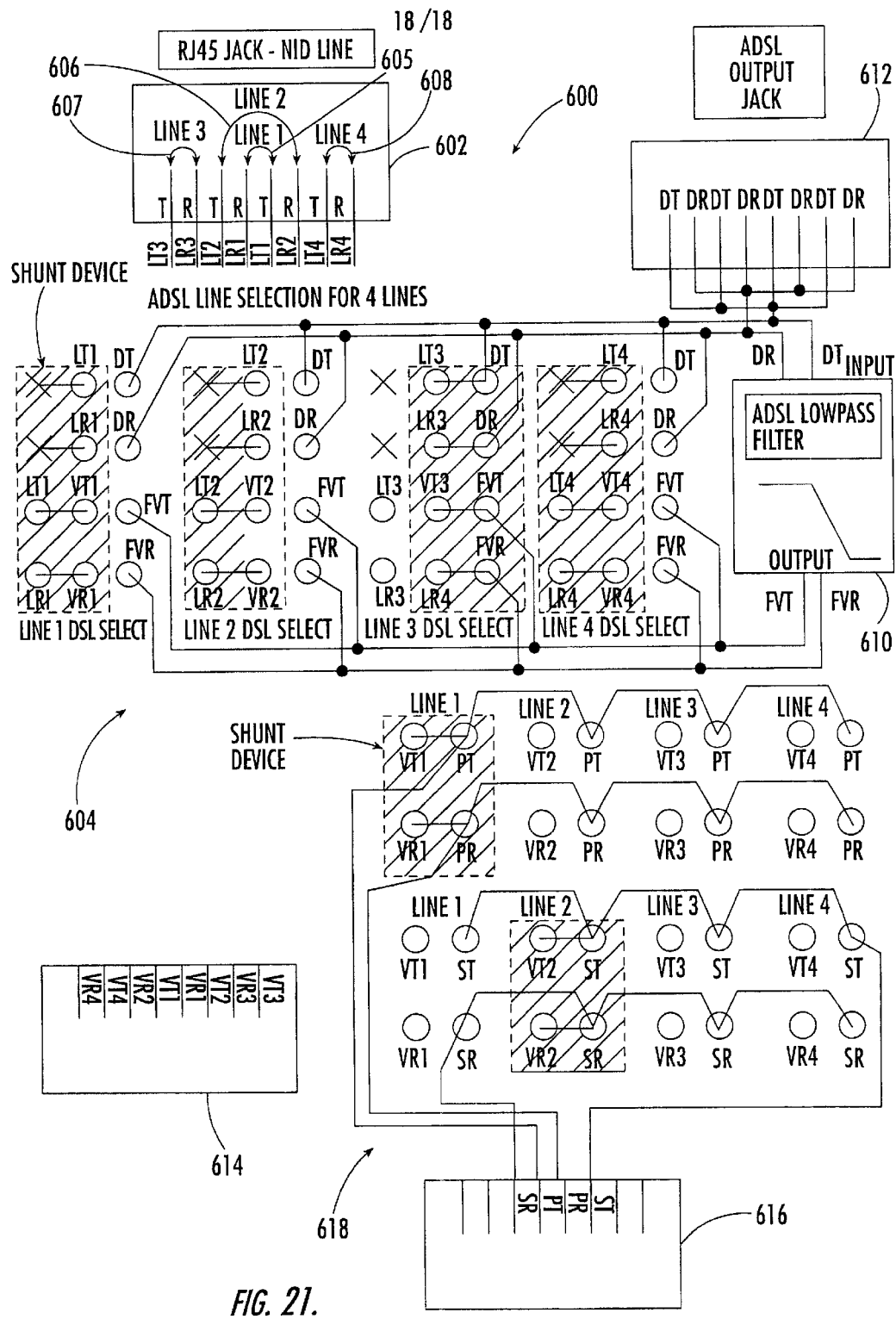

Referring now to FIG. 21, a telephone line distribution apparatus 600 having DSL signal splitting capabilities, according to another embodiment of the present invention, is illustrated schematically. The illustrated telephone line distribution apparatus 600 is configured to handle four incoming telephone lines and includes a first RJ connector 602; a first switching device 604 that identifies which one of the first, second, third, or fourth incoming telephone lines 605, 606, 607, 608 is carrying DSL signals; a splitter 610 configured to separate DSL signals and voice telephone signals from an identified one of the first, second, third, or fourth and second incoming telephone lines 605, 606, 607, 608; a second RJ connector 612 electrically connected to the splitter 610 that receives DSL signals that have been separated by the splitter from an identified one of the first, second, third, or fourth and second incoming telephone lines 605, 606, 607, 608; and a third RJ connector 614 electrically connected to the splitter 610 and to the first RJ connector 602 to receive the first, second, third, or fourth and second incoming telephone lines 605, 606, 607, 608 that carry voice telephone signals only. An incoming telephone line is identified as carrying both DSL signals and voice signals as described above with respect to FIG. 20.

The illustrated a telephone line distribution apparatus 600 also includes one or more fourth RJ connectors 616 electrically connected to subscriber primary, secondary, tertiary, and fourth telephone lines (not shown) as described above. A second switching device 618 allows a user to select which of the incoming four lines is to be the subscriber primary line and which is to be the subscriber secondary line. Operations for selecting primary and secondary lines are similar to operations described with respect to the embodiment of the present invention illustrated in FIG. 17.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A telephone line distribution apparatus, comprising:
   a first RJ connector, comprising first tip and ring pins electrically connected to respective tip and ring wires of a first incoming telephone line, and second tip and ring pins electrically connected to respective tip and ring wires of a second incoming telephone line;
   at least one second RJ connector comprising first tip and ring pins electrically connected to respective tip and ring wires of a subscriber primary telephone line, and second tip and ring pins electrically connected to respective tip and ring wires of a subscriber secondary telephone line; and
   a switching device having first and second configurations, such that when the switching device is in the first configuration, the first incoming telephone line becomes the subscriber primary telephone line at the at least one second RJ connector, and such that when the switching device is in the second configuration the second incoming telephone line becomes the subscriber primary telephone line at the at least one second RJ connector.

2. The telephone line distribution apparatus according to claim 1, wherein the at least one second RJ connector comprises a plurality of RJ connectors.

3. The telephone line distribution apparatus according to claim 1, wherein the first RJ connector and the at least one second RJ connector comprise respective RJ receptacles.

4. The telephone line distribution apparatus according to claim 1, wherein the switching device comprises:
   a terminal block, comprising:
      first, second, third, and fourth ring terminals in adjacent, spaced-apart relationship;
      first, second, third, and fourth tip terminals in adjacent, spaced-apart relationship;
      wherein the second and fourth ring terminals are electrically connected to the first ring pin of the at least one second RJ connector; and
      wherein the second and fourth tip terminals are electrically connected to the first tip pin of the at least one second RJ connector; and
   a shunt device configured to be removably secured to the terminal block in first and second positions, such that, when in the first position, the shunt device electrically connects the first and second ring terminals of the terminal block and electrically connects the first and second tip terminals of the terminal block so that the first incoming telephone line becomes the subscriber primary telephone line at the at least one second RJ connector, and such that, when in the second position, the shunt device electrically connects the third and fourth ring terminals of the terminal block and electrically connects the third and fourth tip terminals of the terminal block so that the second incoming telephone line becomes the subscriber primary telephone line at the at least one second RJ connector.

5. The telephone line distribution apparatus according to claim 4, wherein the second and third ring terminals are configured such that the shunt device cannot electrically connect the second and third ring terminals together, and wherein the second and third tip terminals are configured such that the shunt device cannot electrically connect the second and third tip terminals together.

6. The telephone line distribution apparatus according to claim 4, wherein the first, second, third, and fourth ring terminals comprise respective posts that extend from the terminal block along a first row, and wherein the first, second, third, and fourth tip terminals comprise respective posts that extend from the terminal block along a second row that is in adjacent, spaced-apart relationship with the first row.

7. The telephone line distribution apparatus according to claim 1, wherein the first RJ connector, the at least one second RJ connector, and the switching device are mounted on a first printed circuit board (PCB).

8. The telephone line distribution apparatus according to claim 7, wherein the first PCB is removably connected to a second PCB that comprises:
   at least one third RJ connector comprising first tip and ring pins electrically connected to respective tip and ring wires of a subscriber primary telephone line, and second tip and ring pins electrically connected to respective tip and ring wires of a subscriber secondary telephone line; and
   a second switching device having first and second configurations, such that when the second switching device is in the first configuration, the first incoming telephone line becomes the subscriber primary telephone line at the at least one third RJ connector, and such that when the second switching device is in the second configuration the second incoming telephone line becomes the subscriber primary telephone line at the at least one third RJ connector.

9. The telephone line distribution apparatus according to claim 8, wherein the second switching device comprises:
   a second terminal block, comprising:
      first, second, third, and fourth ring terminals in adjacent, spaced-apart relationship;
      first, second, third, and fourth tip terminals in adjacent, spaced-apart relationship;
      wherein the second and fourth ring terminals are electrically connected to the first ring pin of the at least one third RJ connector; and
      wherein the second and fourth tip terminals are electrically connected to the first tip pin of the at least one third RJ connector;

a second shunt device configured to be removably secured to the second terminal block in first and second positions, such that, when in the first position, the second shunt device electrically connects the first and second ring terminals of the second terminal block and electrically connects the first and second tip terminals of the second terminal block so that the first incoming telephone line becomes the subscriber primary telephone line at the at least one third RJ connector, and such that, when in the second position, the second shunt device electrically connects the third and fourth ring terminals of the second terminal block and electrically connects the third and fourth tip terminals of the second terminal block so that the second incoming telephone line becomes the subscriber primary telephone line at the at least one third RJ connector.

10. A cable distribution apparatus, comprising:

a housing; and a telephone line distribution apparatus removably secured within the housing, comprising:

a first RJ connector, comprising first tip and ring pins electrically connected to respective tip and ring wires of a first incoming telephone line, and second tip and ring pins electrically connected to respective tip and ring wires of a second incoming telephone line;

at least one second RJ connector comprising first tip and ring pins electrically connected to respective tip and ring wires of a subscriber primary telephone line, and second tip and ring pins electrically connected to respective tip and ring wires of a subscriber secondary telephone line; and a switching device having first and second configurations, such that when the switching device is in the first configuration, the first incoming telephone line becomes the subscriber primary telephone line at the at least one second RJ connector, and such that when the switching device is in the second configuration the second incoming telephone line becomes the subscriber primary telephone line at the at least one second RJ connector.

11. The cable distribution apparatus according to claim 10, wherein the at least one second RJ connector comprises a plurality of RJ connectors.

12. The cable distribution apparatus according to claim 10, wherein the first RJ connector and the at least one second RJ connector comprise respective RJ receptacles.

13. The cable distribution apparatus according to claim 10, wherein the switching device comprises:

a terminal block, comprising:

first, second, third, and fourth ring terminals in adjacent, spaced-apart relationship;

first, second, third, and fourth tip terminals in adjacent, spaced-apart relationship;

wherein the second and fourth ring terminals are electrically connected to the first ring pin of the at least one second RJ connector; and wherein the second and fourth tip terminals are electrically connected to the first tip pin of the at least one second RJ connector; and a shunt device configured to be removably secured to the terminal block in first and second positions, such that, when in the first position, the shunt device electrically connects the first and second ring terminals of the terminal block and electrically connects the first and second tip terminals of the terminal block so that the first incoming telephone line becomes the subscriber primary telephone line at the at least one second RJ connector, and such that, when in the second position, the shunt device electrically connects the third and fourth ring terminals of the terminal block and electrically connects the third and fourth tip terminals of the terminal block so that the second incoming telephone line becomes the subscriber primary telephone line at the at least one second RJ connector.

14. The cable distribution apparatus according to claim 13, wherein the second and third ring terminals are configured such that the shunt device cannot electrically connect the second and third ring terminals together, and wherein the second and third tip terminals are configured such that the shunt device cannot electrically connect the second and third tip terminals together.

15. The cable distribution apparatus according to claim 13, wherein the first, second, third, and fourth ring terminals comprise respective posts that extend from the terminal block along a first row, and wherein the first, second, third, and fourth tip terminals comprise respective posts that extend from the terminal block along a second row that is in adjacent, spaced-apart relationship with the first row.

16. The cable distribution apparatus according to claim 10, wherein the first RJ connector, the at least one second RJ connector, and the switching device are mounted on a first printed circuit board (PCB).

17. The cable distribution apparatus according to claim 16, wherein the first PCB is removably connected to a second PCB that comprises:

at least one third RJ connector comprising first tip and ring pins electrically connected to respective tip and ring wires of a subscriber primary telephone line, and second tip and ring pins electrically connected to respective tip and ring wires of a subscriber secondary telephone line; and a second switching device having first and second configurations, such that when the second switching device is in the first configuration, the first incoming telephone line becomes the subscriber primary telephone line at the at least one third RJ connector, and such that when the second switching device is in the second configuration the second incoming telephone line becomes the subscriber primary telephone line at the at least one third RJ connector.

18. The cable distribution apparatus according to claim 17, wherein the second switching device comprises:

a second terminal block, comprising:

first, second, third, and fourth ring terminals in adjacent, spaced-apart relationship;

first, second, third, and fourth tip terminals in adjacent, spaced-apart relationship;

wherein the second and fourth ring terminals are electrically connected to the first ring pin of the at least one third RJ connector; and wherein the second and fourth tip terminals are electrically connected to the first tip pin of the at least one third RJ connector;

a second shunt device configured to be removably secured to the second terminal block in first and second positions, such that, when in the first position, the second shunt device electrically connects the first and second ring terminals of the second terminal block and electrically connects the first and second tip terminals of the second terminal block so that the first incoming telephone line becomes the subscriber primary telephone line at the at least one third RJ connector, and such that, when in the second position, the second shunt device electrically connects the third and fourth ring terminals of the second terminal block and electrically connects the third and fourth tip terminals of the second terminal block so that the second incoming telephone line becomes the subscriber primary telephone line at the at least one third RJ connector.

19. The cable distribution apparatus according to claim 16, wherein the first PCB is mounted to a frame that is removably secured within the housing.

20. The cable distribution apparatus according to claim 19, further comprising a locking mechanism attached to the frame that is configured to releasably secure the frame within the housing.

21. A telephone line distribution apparatus, comprising:
   a printed circuit board (PCB);
   a first RJ connector mounted on the PCB, the first RJ connector comprising first tip and ring pins electrically connected to respective tip and ring wires of a first incoming telephone line, and second tip and ring pins electrically connected to respective tip and ring wires of a second incoming telephone line;
   at least one second RJ connector mounted on the PCB, the at least one second RJ connector comprising first tip and ring pins electrically connected to respective tip and ring wires of a subscriber primary telephone line, and second tip and ring pins electrically connected to respective tip and ring wires of a subscriber secondary telephone line;
   a terminal block, comprising:
      first, second, third, and fourth ring terminals in adjacent, spaced-apart relationship;
      first, second, third, and fourth tip terminals in adjacent, spaced-apart relationship;
      wherein the second and fourth ring terminals are electrically connected to the first ring pin of the at least one second RJ connector; and
      wherein the second and fourth tip terminals are electrically connected to the first tip pin of the at least one second RJ connector; and
   a shunt device configured to be removably secured to the terminal block in first and second positions, such that, when in the first position, the shunt device electrically connects the first and second ring terminals and electrically connects the first and second tip terminals so that the first incoming telephone line becomes the subscriber primary telephone line at the at least one second RJ connector, and such that, when in the second position, the shunt device electrically connects the third and fourth ring terminals and electrically connects the third and fourth tip terminals so that the second incoming telephone line becomes the subscriber primary telephone line at the at least one second RJ connector.

22. The telephone line distribution apparatus according to claim 21, wherein the first RJ connector and the at least one second RJ connector comprise respective RJ receptacles.

23. The telephone line distribution apparatus according to claim 21, wherein the at least one second RJ connector comprises a plurality of RJ connectors.

24. The telephone line distribution apparatus according to claim 21, wherein the second and third ring terminals are configured such that the shunt device cannot electrically connect the second and third ring terminals together, and wherein the second and third tip terminals are configured such that the shunt device cannot electrically connect the second and third tip terminals together.

25. The telephone line distribution apparatus according to claim 21, wherein the first, second, third, and fourth ring terminals comprise respective posts that extend from the terminal block along a first row, and wherein the first, second, third, and fourth tip terminals comprise respective posts that extend from the terminal block along a second row that is in adjacent, spaced-apart relationship with the first row.

26. A telephone line distribution apparatus, comprising:
   a first RJ connector, comprising first tip and ring pins electrically connected to respective tip and ring wires of a first incoming telephone line, second tip and ring pins electrically connected to respective tip and ring wires of a second incoming telephone line, and third tip and ring pins electrically connected to respective tip and ring wires of a third incoming telephone line;
   at least one second RJ connector comprising first tip and ring pins electrically connected to respective tip and ring wires of a subscriber primary telephone line, second tip and ring pins electrically connected to respective tip and ring wires of a subscriber secondary telephone line, and third tip and ring pins electrically connected to respective tip and ring wires of a subscriber tertiary telephone line;
   a terminal block, comprising:
      first, second, third, fourth, fifth, and sixth ring terminals in adjacent, spaced-apart relationship;
      first, second, third, fourth, fifth, and sixth tip terminals in adjacent, spaced-apart relationship;
      wherein the second, fourth, and sixth ring terminals are electrically connected to the first ring pin of the at least one second RJ connector; and
      wherein the second, fourth, and sixth tip terminals are electrically connected to the first tip pin of the at least one second RJ connector; and
   a shunt device configured to be removably secured to the terminal block in first, second, and third positions, such that, when in the first position, the shunt device electrically connects the first and second ring terminals and electrically connects the first and second tip terminals so that the first incoming telephone line becomes the subscriber primary telephone line at the at least one second RJ connector, such that, when in the second position, the shunt device electrically connects the third and fourth ring terminals and electrically connects the third and fourth tip terminals so that the second incoming telephone line becomes the subscriber primary telephone line at the at least one second RJ connector, and such that, when in the third position, the shunt device electrically connects the fifth and sixth ring terminals and electrically connects the fifth and sixth tip terminals so that the third incoming telephone line becomes the subscriber primary telephone line at the at least one second RJ connector.

27. The telephone line distribution apparatus according to claim 26, wherein the first RJ connector and the at least one second RJ connector comprise respective RJ receptacles.

28. The telephone line distribution apparatus according to claim 26, wherein the at least one second RJ connector comprises a plurality of RJ connectors.

29. The telephone line distribution apparatus according to claim 26, wherein the second and third ring terminals are configured such that the shunt device cannot electrically connect the second and third ring terminals together, and wherein the fourth and fifth ring terminals are configured such that the shunt device cannot electrically connect the fourth and fifth ring terminals together.

30. The telephone line distribution apparatus according to claim 26, wherein the second and third tip terminals are configured such that the shunt device cannot electrically connect the second and third tip terminals together, and wherein the fourth and fifth tip terminals are configured such that the shunt device cannot electrically connect the fourth and fifth tip terminals together.

31. The telephone line distribution apparatus according to claim 26, wherein the first, second, third, fourth, fifth, and sixth ring terminals comprise respective posts that extend from the terminal block along a first row, and wherein the first, second, third, fourth, fifth, and sixth tip terminals comprise respective posts that extend from the terminal block along a second row that is in adjacent, spaced-apart relationship with the first row.

32. A telephone line distribution apparatus, comprising:
a first RJ connector, comprising first tip and ring pins electrically connected to respective tip and ring wires of a first incoming telephone line, second tip and ring pins electrically connected to respective tip and ring wires of a second incoming telephone line, and third tip and ring pins electrically connected to respective tip and ring wires of a third incoming telephone line;
at least one second RJ connector comprising first tip and ring pins electrically connected to respective tip and ring wires of a subscriber primary telephone line, second tip and ring pins electrically connected to respective tip and ring wires of a subscriber secondary telephone line, and third tip and ring pins electrically connected to respective tip and ring wires of a subscriber tertiary telephone line;
a first terminal block, comprising:
  first, second, third, fourth, fifth, and sixth ring terminals in adjacent, spaced-apart relationship, and first, second, third, fourth, fifth, and sixth tip terminals in adjacent, spaced-apart relationship;
  wherein the second, fourth, and sixth ring terminals of the first terminal block are electrically connected to the first ring pin of the at least one second RJ connector;
  wherein the second, fourth, and sixth tip terminals of the first terminal block are electrically connected to the first tip pin of the at least one second RJ connector;
  a first shunt device configured to be removably secured to the first terminal block in first, second, and third positions, such that, when in the first position, the first shunt device electrically connects the first and second ring terminals and electrically connects the first and second tip terminals so that the first incoming telephone line becomes the subscriber primary telephone line at the at least one second RJ connector, such that, when in the second position, the first shunt device electrically connects the third and fourth ring terminals and electrically connects the third and fourth tip terminals so that the second incoming telephone line becomes the subscriber primary telephone line at the at least one second RJ connector, and such that, when in the third position, the first shunt device electrically connects the fifth and sixth ring terminals and electrically connects the fifth and sixth tip terminals so that the third incoming telephone line becomes the subscriber primary telephone line at the at least one second RJ connector; and
a second terminal block, comprising:
  first, second, third, fourth, fifth, and sixth ring terminals in adjacent, spaced-apart relationship, and first, second, third, fourth, fifth, and sixth tip terminals in adjacent, spaced-apart relationship;
  wherein the second, fourth, and sixth ring terminals of the second terminal block are electrically connected to the second ring pin of the at least one second RJ connector; and
  wherein the second, fourth, and sixth tip terminals of the second terminal block are electrically connected to the second tip pin of the at least one second RJ connector.

33. The telephone line distribution apparatus according to claim 32, further comprising a second shunt device configured to be removably secured to the second terminal block in first, second, and third positions, such that, when in the first position, the second shunt device electrically connects the first and second ring terminals and electrically connects the first and second tip terminals so that the first incoming telephone line becomes the subscriber secondary telephone line at the at least one second RJ connector, such that, when in the second position, the second shunt device electrically connects the third and fourth ring terminals and electrically connects the third and fourth tip terminals so that the second incoming telephone line becomes the subscriber secondary telephone line at the at least one second RJ connector, and such that, when in the third position, the second shunt device electrically connects the fifth and sixth ring terminals and electrically connects the fifth and sixth tip terminals so that the third incoming telephone line becomes the subscriber secondary telephone line at the at least one second RJ connector.

34. The telephone line distribution apparatus according to claim 32, wherein the first, second, and third RJ connectors comprise respective RJ receptacles.

35. The telephone line distribution apparatus according to claim 32, wherein the at least one second RJ connector comprises a plurality of RJ connectors.

36. The telephone line distribution apparatus according to claim 32, wherein the second and third ring terminals of the first terminal block are configured such that the first shunt device cannot electrically connect the second and third ring terminals of the first terminal block together, and wherein the fourth and fifth ring terminals of the first terminal block are configured such that the first shunt device cannot electrically connect the fourth and fifth ring terminals of the first terminal block together.

37. The telephone line distribution apparatus according to claim 32, wherein the second and third tip terminals of the first terminal block are configured such that the first shunt device cannot electrically connect the second and third tip terminals of the first terminal block together, and wherein the fourth and fifth tip terminals of the first terminal block are configured such that the first shunt device cannot electrically connect the fourth and fifth tip terminals of the first terminal block together.

38. The telephone line distribution apparatus according to claim 32, wherein the second and third ring terminals of the second terminal block are configured such that the second shunt device cannot electrically connect the second and third ring terminals of the second terminal block together, and wherein the fourth and fifth ring terminals of the second terminal block are configured such that the second shunt device cannot electrically connect the fourth and fifth ring terminals of the second terminal block together.

39. The telephone line distribution apparatus according to claim 32, wherein the second and third tip terminals of the second terminal block are configured such that the second shunt device cannot electrically connect the second and third tip terminals of the second terminal block together, and wherein the fourth and fifth tip terminals of the second terminal block are configured such that the second shunt device cannot electrically connect the fourth and fifth tip terminals of the second terminal block together.

40. The telephone line distribution apparatus according to claim 32 wherein the first and second terminal blocks are spaced apart such that the first shunt device cannot electrically connect terminals from the first and second terminal blocks at the same time, and such that the second shunt device cannot electrically connect terminals from the first and second terminal blocks at the same time.

41. A telephone line distribution apparatus, comprising:
a first RJ connector, comprising first tip and ring pins electrically connected to respective tip and ring wires of a first incoming telephone line, and second tip and ring pins electrically connected to respective tip and ring wires of a second incoming telephone line, wherein one of the first and second incoming telephone lines carries Digital Subscriber Line (DSL) signals in addition to voice telephone signals;
a first switching device that identifies which one of the first and second incoming telephone lines is carrying DSL signals;
a splitter configured to separate DSL signals and voice telephone signals from an identified one of the first and second incoming telephone lines;
a second RJ connector electrically connected to the splitter that receives DSL signals that have been separated by the splitter from an identified one of the first and second incoming telephone lines; and
a third RJ connector electrically connected to the splitter and to the first RJ connector, comprising first tip and ring pins electrically connected to the first incoming telephone line, and second tip and ring pins electrically connected to the second incoming telephone line, and wherein the first and second incoming telephone lines at the respective first and second tip and ring pins carry voice telephone signals only.

42. The telephone line distribution apparatus according to claim 41, further comprising
a fourth RJ connector comprising first tip and ring pins electrically connected to respective tip and ring wires of a subscriber primary telephone line, and second tip and ring pins electrically connected to respective tip and ring wires of a subscriber secondary telephone line; and
a second switching device electrically connected to the third RJ connector and having first and second configurations, such that when the second switching device is in the first configuration, the first incoming telephone line becomes the subscriber primary telephone line at the fourth RJ connector, and such that when the second switching device is in the second configuration the second incoming telephone line becomes the subscriber primary telephone line at the fourth RJ connector.

43. The telephone line distribution apparatus according to claim 42, wherein the first, second, third and fourth RJ connectors comprise respective RJ receptacles.

44. The telephone line distribution apparatus according to claim 41, wherein the first switching device comprises:
a first terminal block associated with the first incoming telephone line, comprising:
a pair of adjacent, spaced-apart DSL signal tip and ring terminals electrically connected to respective tip and ring terminals of the second RJ connector;
a pair of adjacent, spaced-apart voice signal tip and ring terminals electrically connected to the splitter; and
at least one pair of tip and ring terminals electrically connected to the first tip and ring pins of the first RJ connector;
a second terminal block associated with the second incoming telephone line, comprising:
a pair of adjacent, spaced-apart DSL signal tip and ring terminals electrically connected to respective tip and ring terminals of the second RJ connector;
a pair of adjacent, spaced-apart voice signal tip and ring terminals electrically connected to the splitter; and
at least one pair of tip and ring terminals electrically connected to the second tip and ring pins of the first RJ connector;
a first shunt device configured to be removably secured to the first terminal block in first and second positions, such that, when in the first position, the first incoming telephone line is identified as carrying only voice telephone signals, and when in the second position, the first incoming telephone line is identified as carrying both voice telephone signals and DSL signals; and
a second shunt device configured to be removably secured to the second terminal block in first and second positions, such that, when in the first position, the second incoming telephone line is identified as carrying only voice telephone signals, and when in the second position, the second incoming telephone line is identified as carrying both voice telephone signals and DSL signals.

45. The telephone line distribution apparatus according to claim 42, wherein the second switching device comprises:
a third terminal block, comprising:
first, second, third, and fourth ring terminals in adjacent, spaced-apart relationship;
first, second, third, and fourth tip terminals in adjacent, spaced-apart relationship;
wherein the second and fourth ring terminals are electrically connected to the first ring pin of the fourth RJ connector; and
wherein the second and fourth tip terminals are electrically connected to the first tip pin of the fourth RJ connector; and
a third shunt device configured to be removably secured to the third terminal block in first and second positions, such that, when in the first position, the third shunt device electrically connects the first and second ring terminals of the third terminal block and electrically connects the first and second tip terminals of the third terminal block so that the first incoming telephone line becomes the subscriber primary telephone line at the fourth RJ connector, and such that, when in the second position, the third shunt device electrically connects the third and fourth ring terminals of the third terminal block and electrically connects the third and fourth tip terminals of the third terminal block so that the second incoming telephone line becomes the subscriber primary telephone line at the fourth RJ connector.

46. The telephone line distribution apparatus according to claim 42, wherein the first, second, third, and fourth RJ connectors and the first and second switching devices are mounted on a printed circuit board (PCB).

47. The telephone line distribution apparatus according to claim 42, further comprising a plurality of fourth RJ connectors.

48. A cable distribution apparatus, comprising:
a housing; and
a telephone line distribution apparatus removably secured within the housing, comprising:

a first RJ connector, comprising first tip and ring pins electrically connected to respective tip and ring wires of a first incoming telephone line, and second tip and ring pins electrically connected to respective tip and ring wires of a second incoming telephone line, wherein one of the first and second incoming telephone lines carries Digital Subscriber Line (DSL) signals in addition to voice telephone signals;

a first switching device that identifies which one of the first and second incoming telephone lines is carrying DSL signals;

a splitter configured to separate DSL signals and voice telephone signals from an identified one of the first and second incoming telephone lines;

a second RJ connector electrically connected to the splitter that receives DSL signals that have been separated by the splitter from an identified one of the first and second incoming telephone lines; and a third RJ connector electrically connected to the splitter and to the first RJ connector, comprising first tip and ring pins electrically connected to the first incoming telephone line, and second tip and ring pins electrically connected to the second incoming telephone line, and wherein the first and second incoming telephone lines at the respective first and second tip and ring pins carry voice telephone signals only.

49. The cable distribution apparatus according to claim 48, wherein the telephone line distribution apparatus further comprises:

a fourth RJ connector comprising first tip and ring pins electrically connected to respective tip and ring wires of a subscriber primary telephone line, and second tip and ring pins electrically connected to respective tip and ring wires of a subscriber secondary telephone line; and a second switching device electrically connected to the third RJ connector and having first and second configurations, such that when the second switching device is in the first configuration, the first incoming telephone line becomes the subscriber primary telephone line at the fourth RJ connector, and such that when the second switching device is in the second configuration the second incoming telephone line becomes the subscriber primary telephone line at the fourth RJ connector.

50. The cable distribution apparatus according to claim 49, wherein the first, second, third and fourth RJ connectors comprise respective RJ receptacles.

51. The cable distribution apparatus according to claim 48, wherein the first switching device comprises:

a first terminal block associated with the first incoming telephone line, comprising:
a pair of adjacent, spaced-apart DSL signal tip and ring terminals electrically connected to respective tip and ring terminals of the second RJ connector;
a pair of adjacent, spaced-apart voice signal tip and ring terminals electrically connected to the splitter; and
at least one pair of tip and ring terminals electrically connected to the first tip and ring pins of the first RJ connector;

a second terminal block associated with the second incoming telephone line, comprising:
a pair of adjacent, spaced-apart DSL signal tip and ring terminals electrically connected to respective tip and ring terminals of the second RJ connector;
a pair of adjacent, spaced-apart voice signal tip and ring terminals electrically connected to the splitter; and
at least one pair of tip and ring terminals electrically connected to the second tip and ring pins of the first RJ connector;

a first shunt device configured to be removably secured to the first terminal block in first and second positions, such that, when in the first position, the first incoming telephone line is identified as carrying only voice telephone signals, and when in the second position, the first incoming telephone line is identified as carrying both voice telephone signals and DSL signals; and a second shunt device configured to be removably secured to the second terminal block in first and second positions, such that, when in the first position, the second incoming telephone line is identified as carrying only voice telephone signals, and when in the second position, the second incoming telephone line is identified as carrying both voice telephone signals and DSL signals.

52. The cable distribution apparatus according to claim 49, wherein the second switching device comprises:

a third terminal block, comprising:
first, second, third, and fourth ring terminals in adjacent, spaced-apart relationship;
first, second, third, and fourth tip terminals in adjacent, spaced-apart relationship;
wherein the second and fourth ring terminals are electrically connected to the first ring pin of the fourth RJ connector; and
wherein the second and fourth tip terminals are electrically connected to the first tip pin of the fourth RJ connector; and a third shunt device configured to be removably secured to the third terminal block in first and second positions, such that, when in the first position, the third shunt device electrically connects the first and second ring terminals of the third terminal block and electrically connects the first and second tip terminals of the third terminal block so that the first incoming telephone line becomes the subscriber primary telephone line at the fourth RJ connector, and such that, when in the second position, the third shunt device electrically connects the third and fourth ring terminals of the third terminal block and electrically connects the third and fourth tip terminals of the third terminal block so that the second incoming telephone line becomes the subscriber primary telephone line at the fourth RJ connector.

53. The cable distribution apparatus according to claim 49, wherein the first, second, third, and fourth RJ connectors and the first and second switching devices are mounted on a printed circuit board (PCB).

54. The cable distribution apparatus according to claim 53, wherein the first PCB is mounted to a frame that is removably secured within the housing.

55. The cable distribution apparatus according to claim 54, further comprising a locking mechanism attached to the frame that is configured to releasably secure the frame within the housing.

56. The cable distribution apparatus according to claim 49, wherein the telephone line distribution apparatus further comprises a plurality of fourth RJ connectors.

* * * * *